US011192591B2

(12) United States Patent
Sato et al.

(10) Patent No.: US 11,192,591 B2
(45) Date of Patent: Dec. 7, 2021

(54) VEHICLE BODY STRUCTURE OF VEHICLE

(71) Applicant: MAZDA MOTOR CORPORATION, Hiroshima (JP)

(72) Inventors: Kenichi Sato, Hiroshima (JP); Masanori Fukuda, Hiroshima (JP); Shuichi Nakagami, Higashihiroshima (JP); Akihiro Kawano, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 13 days.

(21) Appl. No.: 16/954,845

(22) PCT Filed: Mar. 1, 2019

(86) PCT No.: PCT/JP2019/008129
§ 371 (c)(1),
(2) Date: Jun. 17, 2020

(87) PCT Pub. No.: WO2019/172126
PCT Pub. Date: Sep. 12, 2019

(65) Prior Publication Data
US 2021/0086837 A1    Mar. 25, 2021

(30) Foreign Application Priority Data

Mar. 6, 2018    (JP) .............................. JP2018-039486

(51) Int. Cl.
*B62D 25/04*    (2006.01)
*B62D 25/08*    (2006.01)
(Continued)

(52) U.S. Cl.
CPC ........... *B62D 25/04* (2013.01); *B62D 25/025* (2013.01); *B62D 25/06* (2013.01); *B62D 25/08* (2013.01);
(Continued)

(58) Field of Classification Search
CPC ...... B62D 25/04; B62D 25/025; B62D 25/06; B62D 25/088; B62D 25/16;
(Continued)

(56) References Cited

U.S. PATENT DOCUMENTS

2018/0244318 A1    8/2018    Kiyoshita et al.

FOREIGN PATENT DOCUMENTS

| JP | 2005-170228 A | 6/2005 |
| JP | 2006-069268 A | 3/2006 |

(Continued)

OTHER PUBLICATIONS

International Search Report issued in PCT/JP2019/008129; dated Apr. 9, 2019.

*Primary Examiner* — Dennis H Pedder
(74) *Attorney, Agent, or Firm* — Studebaker & Brackett PC

(57) ABSTRACT

A vehicle body structure in a vehicle rear portion includes a first rear lateral ring-shaped vehicle body framework (RWC1) extending in a vehicle lateral direction in a vehicle body rear portion (1R) from vicinities of a pair of left and right damper support portions (54) supporting suspension dampers (55) and disposed in rear wheelhouses (52) at vehicle rear of side door openings (Es) of the vehicle. The vehicle body structure also includes coupling members (33) coupling longitudinal ring-shaped vehicle body frameworks (SLC) each having a substantially ring shape in a vehicle longitudinal direction to the first rear lateral ring-shaped vehicle body framework (RWC1).

18 Claims, 16 Drawing Sheets

(51) Int. Cl.
 *B62D 25/02* (2006.01)
 *B62D 25/06* (2006.01)
 *B62D 25/16* (2006.01)
 *B62D 25/20* (2006.01)

(52) U.S. Cl.
 CPC ........... *B62D 25/088* (2013.01); *B62D 25/16* (2013.01); *B62D 25/2036* (2013.01)

(58) Field of Classification Search
 CPC ............ B62D 25/2036; B62D 25/2027; B62D 25/02; B62D 25/087; B62D 25/08; B62D 25/00
 USPC ...... 296/193.05–193.08, 203.01–203.04, 29, 296/30
 See application file for complete search history.

(56) References Cited

FOREIGN PATENT DOCUMENTS

| | | |
|---|---|---|
| JP | 2006-193047 A | 7/2006 |
| JP | 2008-284936 A | 11/2008 |
| JP | 2018-138446 A | 9/2018 |
| JP | 2018-162037 A | 10/2018 |
| WO | 2017/151070 A1 | 9/2017 |

VEHICLE BODY STRUCTURE OF VEHICLE

TECHNICAL FIELD

The technique disclosed here relates to a vehicle body structure forming a vehicle body framework having a substantially ring shape in a vehicle width direction (lateral direction) near damper support portions of rear suspensions.

BACKGROUND ART

For example, as described in Patent Document 1, a floor cross-member, wheelhouse reinforcements, and a rear end cross-member form a vehicle body framework having a substantially ring shape in a vehicle width direction (lateral direction) and extending from portions near damper support portions of left and right rear suspensions to a rear end so that support stiffness of the damper support portions in the rear suspensions can be enhanced.

Substantially ring-shaped vehicle body frameworks are also formed at the peripheries of side door openings and are coupled to a vehicle body framework having a substantially ring shape in the vehicle lateral direction so that support stiffness of suspensions can be enhanced in the entire vehicle body, but the damper support portions in the rear suspensions are separated from the substantially ring-shaped vehicle body frameworks formed at the peripheries of the side door openings. Thus, it has been difficult to enhance support stiffness of the suspensions in the entire vehicle body.

CITATION LIST

Patent Document

PATENT DOCUMENT 1: Japanese Patent Application Publication No. 2006-193047

SUMMARY OF THE INVENTION

Technical Problem

The technique disclosed here has been made in view of the foregoing circumstances, and has an object of providing a vehicle body structure that can enhance support stiffness of suspensions in the entire vehicle body.

Solution to the Problem

The technique disclosed here is directed to a vehicle body structure including: first vehicle body frameworks each having a substantially ring shape in a vehicle longitudinal direction and disposed at peripheries of side door openings of the vehicle; and a second vehicle body framework having a substantially ring shape in a vehicle lateral direction and disposed at vehicle rear of the side door openings of the vehicle, wherein the first vehicle body framework includes a pair of left and right hinge pillars disposed in a vehicle front portion, a pair of left and right front pillars extending rearward in the vehicle from upper ends of the pair of left and right hinge pillars, a pair of left and right roof side rails extending rearward in the vehicle from upper ends of the pair of left and right front pillars, a pair of left and right side pillars disposed along rear ends of the side door openings, and a pair of left and right side sills coupling lower ends of the pair of left and right side pillars to lower ends of the pair of left and right hinge pillars in the vehicle longitudinal direction, the second vehicle body framework includes a rear end cross-member coupling, in the vehicle lateral direction, lower ends of a pair of left and right rear pillars extending rearward and downward in the vehicle from lower ends of the pair of left and right roof side rails, a pair of left and right rear wheelhouses, damper support portions supporting suspension dampers being disposed in upper portions of the pair of left and right rear wheelhouses, a pair of left and right coupling gussets coupling the rear end cross-member to the upper portions of the pair of left and right rear wheelhouses in the vehicle longitudinal direction, a pair of left and right the rear wheelhouses, the damper support portions being disposed in upper portions of the pair of left and right the rear wheelhouses, a pair of left and right wheelhouse reinforcements disposed along the pair of left and right rear wheelhouses and located at vehicle front of the damper support portions, front portions of upper ends of the pair of left and right wheelhouse reinforcements being joined to rear ends of the pair of left and right side pillars, and a floor cross-member coupling lower ends of the pair of left and right wheelhouse reinforcements in the vehicle lateral direction, and the vehicle body structure includes coupling members coupling front ends of the pair of left and right side pillars to the pair of left and right wheelhouse reinforcements, vehicle parts being attached to the coupling members.

With this configuration, support stiffness of suspensions can be enhanced in the entire vehicle body.

Specifically, the vehicle body frameworks each having the substantially ring shape in the vehicle longitudinal direction are constituted by the pair of left and right hinge pillars disposed in the vehicle front portion, the pair of left and right front pillars extending rearward from the upper ends of the hinge pillars, the pair of left and right roof side rails, the pair of left and right side pillars disposed along the rear ends of the side door openings, and the pair of left and right side sills coupling the lower ends of the side pillars to the lower ends of the hinge pillars in the vehicle longitudinal direction. The vehicle body framework having the substantially ring shape in the vehicle lateral direction is constituted by the rear end cross-member coupling, in the vehicle lateral direction, the lower ends of the pair of left and right rear pillars extending rearward and downward from the rear ends of the pair of left and right roof side rails, the pair of left and right coupling gussets coupling the rear end cross-member to upper portions of the rear wheelhouses in the vehicle longitudinal direction, the pair of left and right rear wheelhouses having upper portions in which the damper support portions are disposed, the pair of left and right wheelhouse reinforcements disposed along the rear wheelhouses, located ahead of the damper support portions, and having front portions of the upper ends coupled to the rear ends of the side pillars, and the floor rear cross-member coupling the lower ends of the wheelhouse reinforcements in the vehicle lateral direction.

In addition, the front ends of the side pillars constituting the vehicle body frameworks each having the substantially ring shape in the vehicle longitudinal direction are coupled to the wheelhouse reinforcements constituting the vehicle body framework having the substantially ring shape in the vehicle lateral direction, by the coupling members to which vehicle parts are attached. Thus, vehicle body frameworks having substantially ring shapes in multiple directions with respect to the vehicle can be formed so that support stiffness of the suspensions in the entire vehicle can be enhanced. Thus, forces input by the front suspensions and the rear suspensions can be transferred without delay so that comfort of passengers can be enhanced.

Furthermore, the use of members for attaching the vehicle parts as the coupling members for coupling the substantially ring-shaped vehicle body frameworks can suppress an increase in the number of parts and also suppress an increase in weight.

In addition, the coupling members can reinforce joint portions between the side pillars and the wheelhouse reinforcements, and thus, the side pillars can be coupled to the wheelhouse reinforcements with higher stiffness.

Even in a case where the lower ends of the side pillars are separated away from the damper support portions, both of stiffness at rear edges of the side door openings and support stiffness of the damper support portions are ensured, the side pillars can be coupled to the wheelhouse reinforcements.

The substantially ring-shaped vehicle body framework may have any shape as long as the vehicle body framework has a substantially ring shape with which a mechanical load can be transferred, and may have a substantially ring shape constituted by a plurality of members. A member constituting the substantially ring-shaped vehicle body framework may be a member having a closed cross section, or may be a member having an open cross section as long as the member can be evaluated as a mechanically structural member. The open member preferably constitutes a closed cross section together with another member.

In the vehicle body structure, portions of the coupling members toward the pair of left and right wheelhouse reinforcements may be coupled to front parts of the damper support portions.

With this configuration, the pair of left and right the rear wheelhouses constituting the vehicle body framework having the substantially ring shape in the vehicle lateral direction and having upper portions in which the damper support portions are disposed are directly coupled to the coupling members. Thus, it is possible to enhance stiffness in coupling the vehicle body frameworks each having the substantially ring shape in the vehicle longitudinal direction to the vehicle body framework having the substantially ring shape in the vehicle lateral direction.

Even in the case where the distance between the damper support portions and the side pillar reinforcements is large, the coupling members coupling the wheelhouse reinforcements to the front ends of the side pillar reinforcements can ensure stiffness of the damper support portions, and portions of the wheelhouse reinforcements and the coupling members for attaching vehicle parts are used for coupling the vehicle body frameworks each having the substantially ring shape in the vehicle longitudinal direction to the vehicle body framework having the substantially ring shape in the vehicle lateral direction.

In the vehicle body structure, the coupling members may be constituted by striker attachment brackets to which strikers are attached, and the strikers are configured to be engaged with latches of seat backs.

With this configuration, the striker attachment brackets to be engaged with latches of seat backs function as the coupling members, and the striker attachment brackets are used for enhancing stiffness in coupling the vehicle body frameworks each having the substantially ring shape in the vehicle longitudinal direction to the vehicle body framework having the substantially ring shape in the vehicle lateral direction.

In the vehicle body structure, reinforcing plates to which vehicle parts are attached may be disposed at sides of the damper support portions in side panel inners constituting the pair of left and right side pillars together with side pillar reinforcements, and the reinforcing plates may couple rear pillars extending rearward from rear ends of the pair of left and right roof side rails to rear ends of upper ends of the pair of left and right wheelhouse reinforcements.

With this configuration, the reinforcing plates disposed in the side panel inners at the sides of the damper support portions are coupled to the rear ends of the upper ends of the wheelhouse reinforcements, and the upper ends of the reinforcing plates are coupled to the rear pillars. Thus, the reinforcing plates to which the second vehicle parts are attached are used for enhancing stiffness in coupling the vehicle body frameworks each having the substantially ring shape in the vehicle longitudinal direction to the vehicle body framework having the substantially ring shape in the vehicle lateral direction.

In the vehicle body structure including the reinforcing plates, the reinforcing plates may be constituted by attachment plates to which seatbelt retractors are attached.

With this configuration, the attachment plates for the seatbelt retractors function as the reinforcing plates, and the attachment plates are used for enhancing stiffness in coupling the vehicle body frameworks each having the substantially ring shape in the vehicle longitudinal direction to the vehicle body framework having the substantially ring shape in the vehicle lateral direction.

In the vehicle body structure including the attachment plates, attachment brackets may be disposed for attachment across the attachment plates and the side pillar reinforcements.

With this configuration, the attachment brackets to which the seatbelt retractors are attached are used for enhancing stiffness in coupling the vehicle body frameworks each having the substantially ring shape in the vehicle longitudinal direction to the vehicle body framework having the substantially ring shape in the vehicle lateral direction.

In the vehicle body structure, the damper support portions may extend to the pair of left and right wheelhouse reinforcements, and may be constituted by thick portions thicker than other portions.

With this configuration, the coupling gussets constituting the vehicle body framework having the substantially ring shape in the vehicle lateral direction couples the rear end cross-member to the thick portions in the rear wheelhouse in the vehicle longitudinal direction. Thus, the vehicle body framework has higher stiffness.

In addition, even in the case where the damper support portions disposed in the rear wheelhouses are separated away from the wheelhouse reinforcements, the thick portions thicker than the other portion and extending to the wheelhouse reinforcements can suppress a decrease in support stiffness.

The vehicle body structure may further include a third vehicle body framework having a substantially ring shape in the vehicle lateral direction is disposed near the damper support portions of left and right rear suspensions and constituted by a rear header, side pillar reinforcements disposed at rear ends of the side door openings, the pair of left and right wheelhouse reinforcements, and a floor cross-member.

With this configuration, the side pillar reinforcements are used for coupling the vehicle body framework having the substantially ring shape in the vehicle lateral direction and formed across the rear end from the vicinities of the damper support portions of the left and right rear suspensions to the vehicle body framework having the substantially ring shape in the vehicle lateral direction around the vicinities of the damper support portions of the left and right rear suspensions. Thus, support stiffness of the damper support portions of the rear suspensions in the vehicle body rear portion can be further enhanced so that support stiffness of the suspensions in the entire vehicle body can be enhanced.

Advantages of the Invention

The technique disclosed here can enhance support stiffness of the suspensions in the entire vehicle body.

DESCRIPTION OF EMBODIMENTS

An exemplary embodiment will be described in detail based on the drawings.

Figure 3:
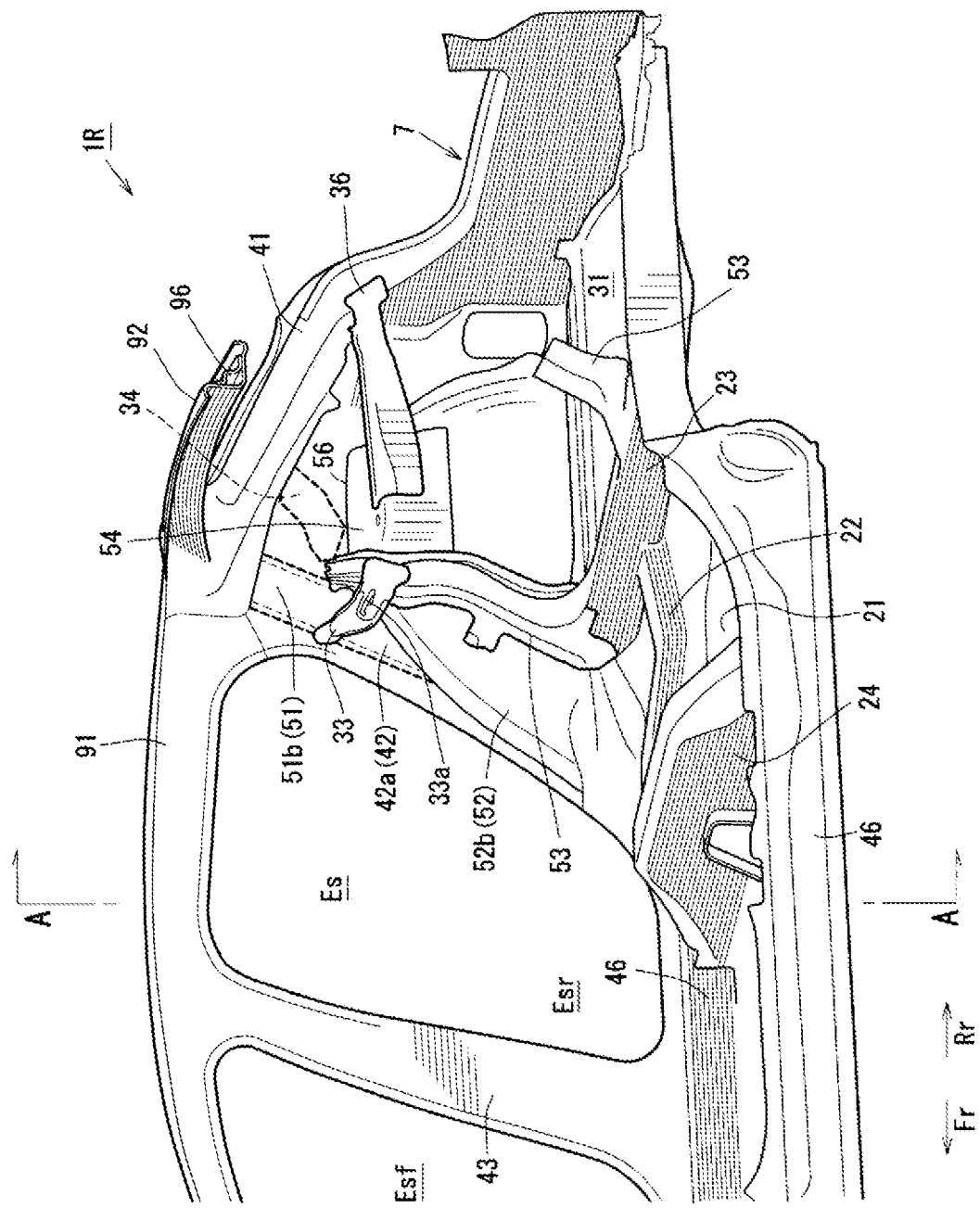
FIG. 3 A side view illustrating the main portion of the vehicle body structure in the vehicle rear portion of the embodiment when seen from the inside.

A vehicle body structure in a vehicle rear portion according to this embodiment is laterally symmetric, and thus, only a left side of the vehicle body is illustrated in FIGS. 3 through 7, 9, and 11 through 16. FIG. 3 does not show an attachment bracket 35.

In the drawings, arrows Fr and Rr represent front-rear directions (longitudinal direction), arrow Fr represents a forward direction, and an arrow Rr represents a rearward direction. Arrows Rh and Lh represent width directions (lateral directions), and arrow Rh represents a rightward direction, and arrow Lh represents a leftward direction. Arrow IN represents an inward direction in a vehicle lateral direction, and arrow OUT represents an outward direction in the vehicle lateral direction.

The vehicle body structure in the vehicle rear portion of this embodiment is a structure of a so-called hatchback vehicle having a rear opening Er in a vehicle body rear portion 1R of a vehicle body 1 in which a trunk 3 is disposed at the rear of (behind) a cabin 2. The rear opening Er is configured to be covered with a lift gate (not shown) such that the rear opening Er is opened and closed. A portion of the vehicle body 1 behind center pillars 43 described later is defined as the vehicle body rear portion 1R, and a portion at the front of (ahead of) the center pillars 43 is defined as a vehicle body front portion 1F.

Figure 1:
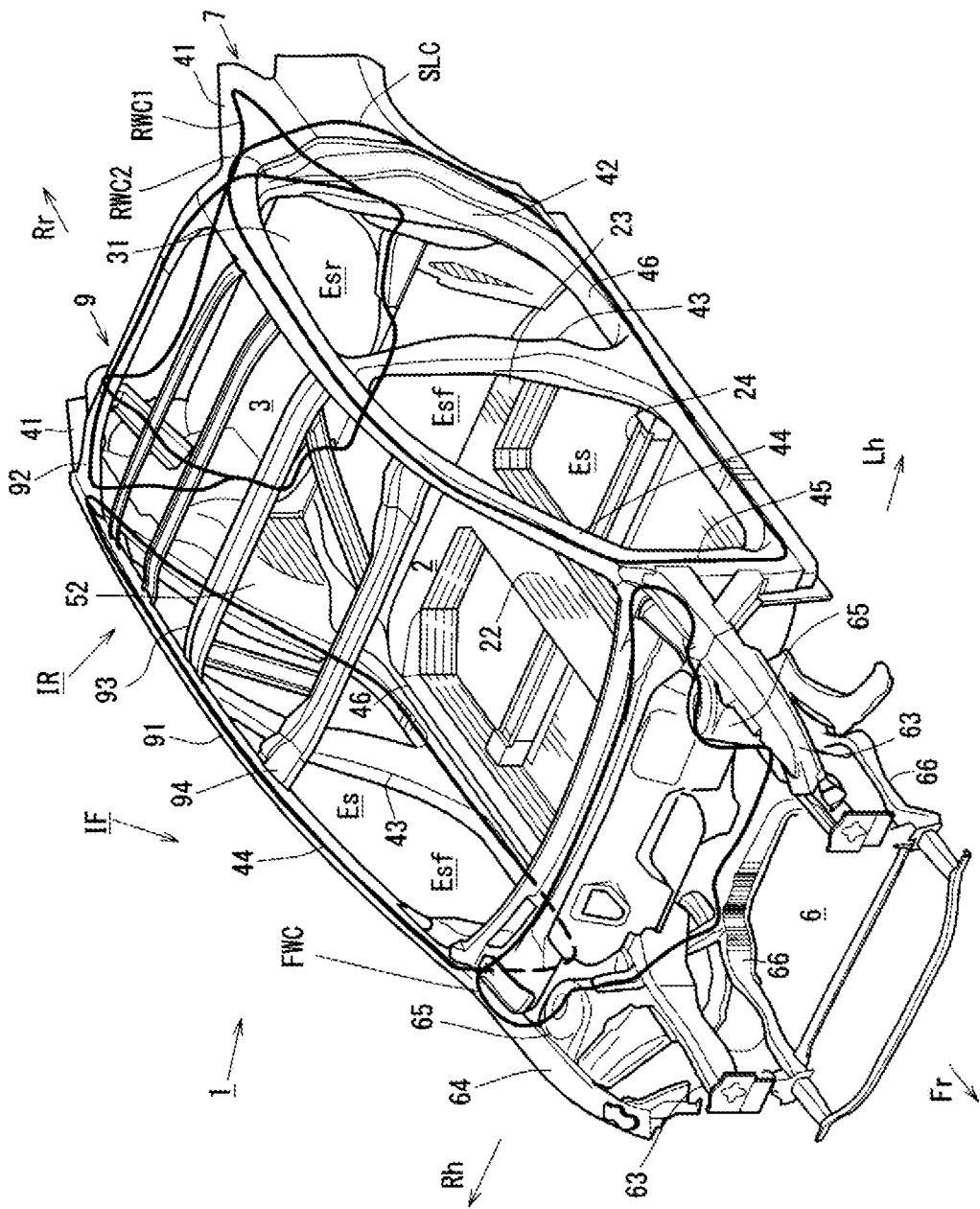
FIG. 1 A perspective view illustrating a vehicle body structure according to an embodiment when seen from the front.
Figure 2:
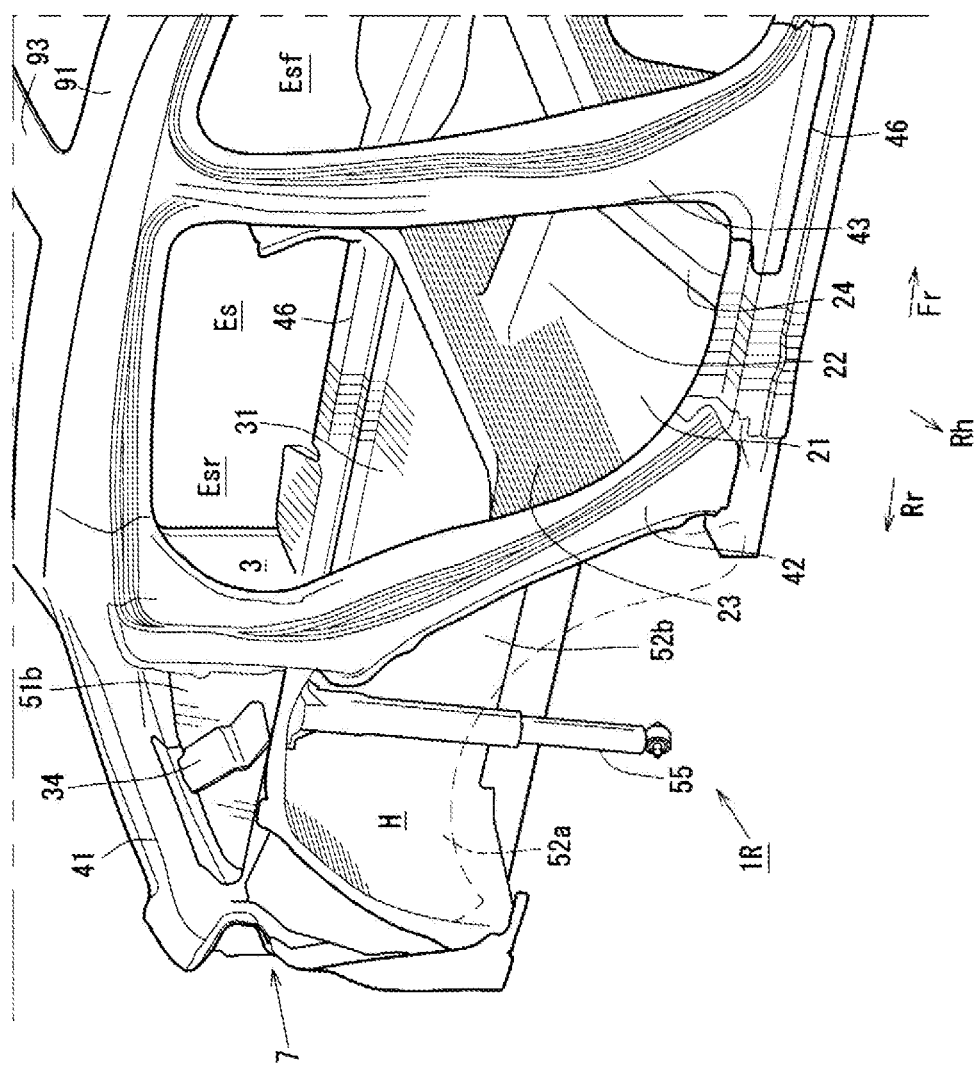
FIG. 2 A perspective cross-sectional view illustrating a main portion of the vehicle body structure in a vehicle rear portion of the embodiment.

More specifically, as illustrated in FIGS. 1 through 3, in the vehicle body rear portion 1R of this embodiment, a floor panel 21 is disposed on the floor of the cabin 2. A laterally center portion of the floor panel 21 projects inward in the cabin 2 to integrally form a tunnel portion 22 (floor tunnel) extending in the vehicle longitudinal direction.

Figure 10:
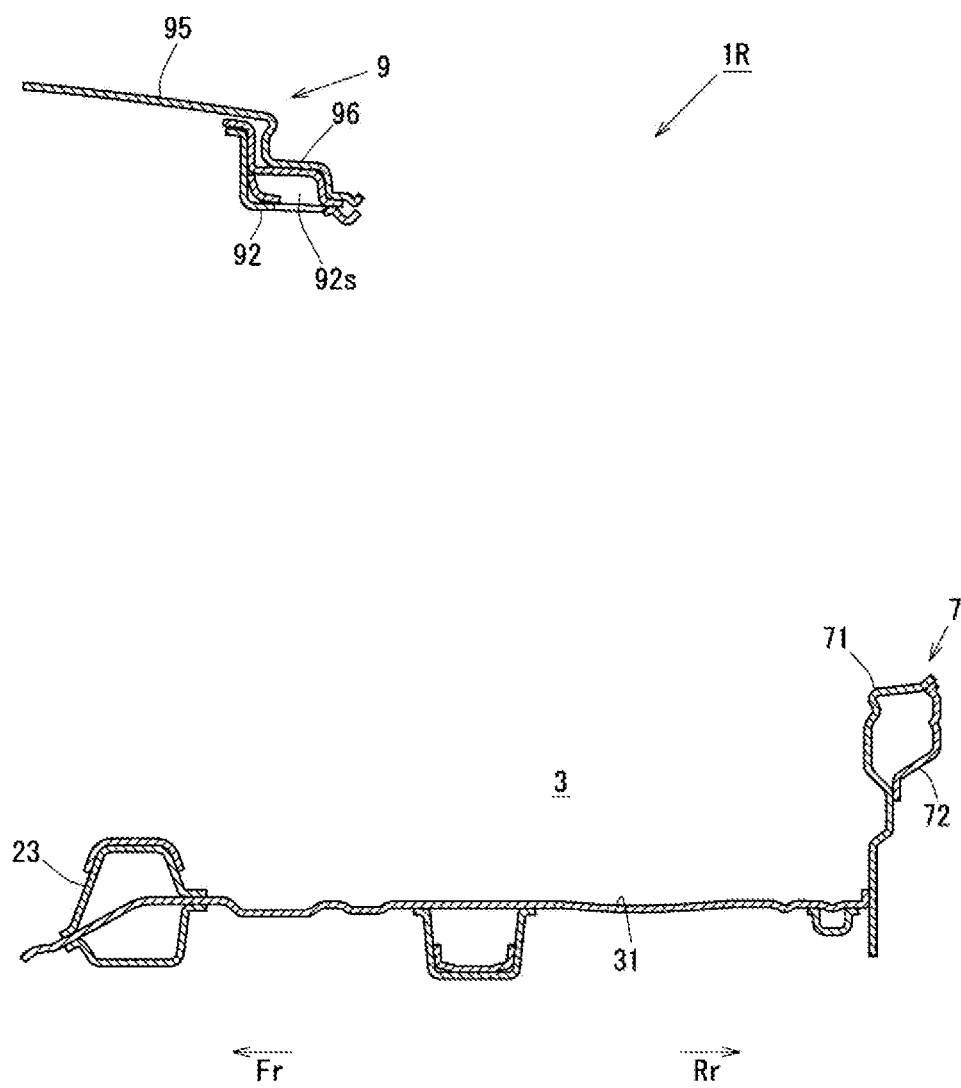
FIG. 10 A front view taken along a B-B cross section in FIG. 5.

As illustrated in FIGS. 3 and 10, the rear end of the floor panel 21 is coupled to a trunk floor portion 31 extending rearward substantially horizontally and in the vehicle lateral direction, through a floor rear cross-member 23 (see FIG. 2) extending as a vertical wall.

Accordingly, in the cabin 2, as illustrated in FIGS. 2 and 3, a passenger space where the floor panel 21 is provided with an unillustrated seat (a seat cushion and a seat back) communicates, in the vehicle longitudinal direction, with a space in the trunk 3 located behind the passenger space and having a trunk floor portion 31 at a higher level than the floor panel 21 at the bottom.

Figure 5:
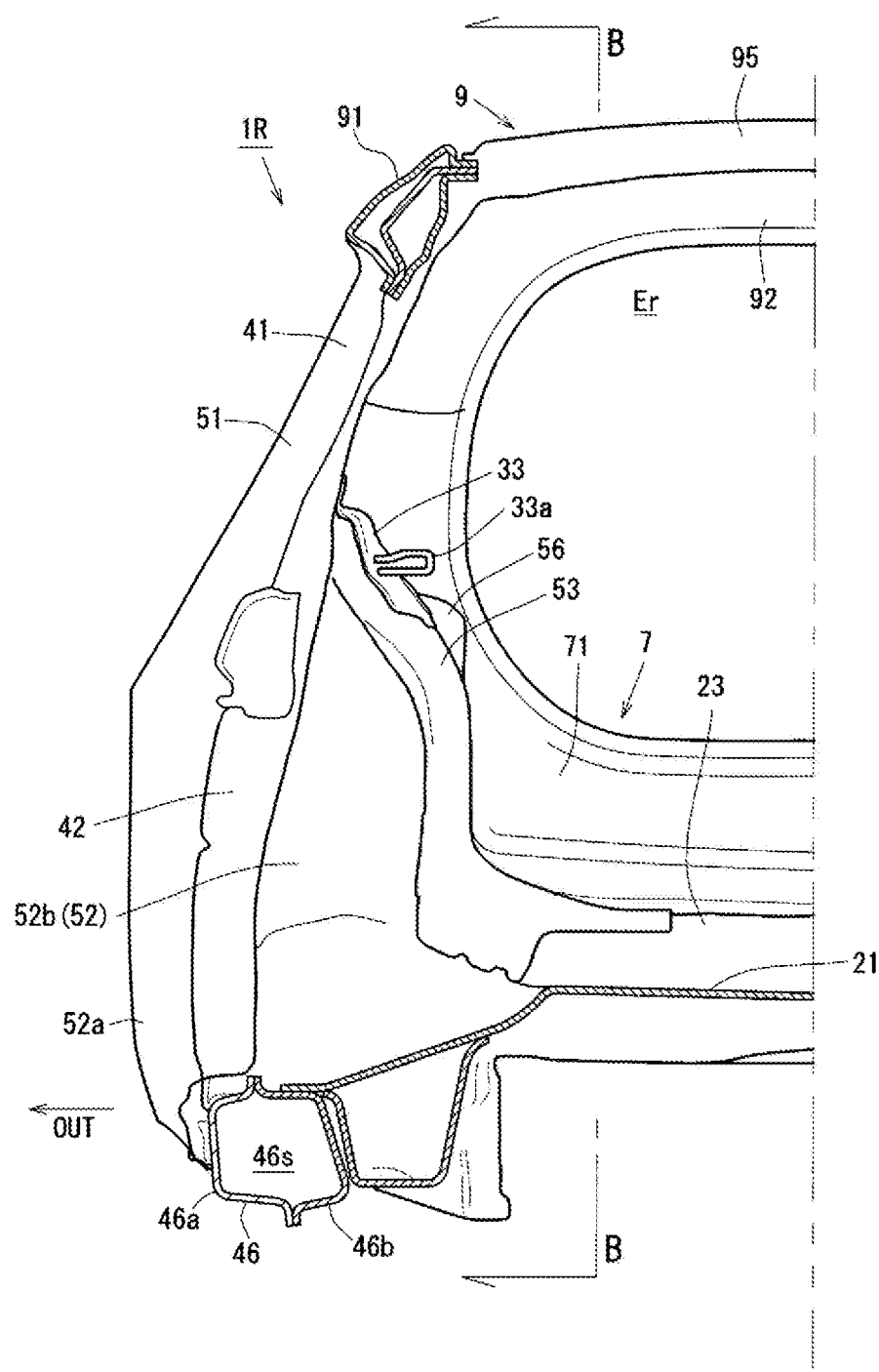
FIG. 5 A front view taken along an A-A cross section in FIG. 3.
Figure 6:
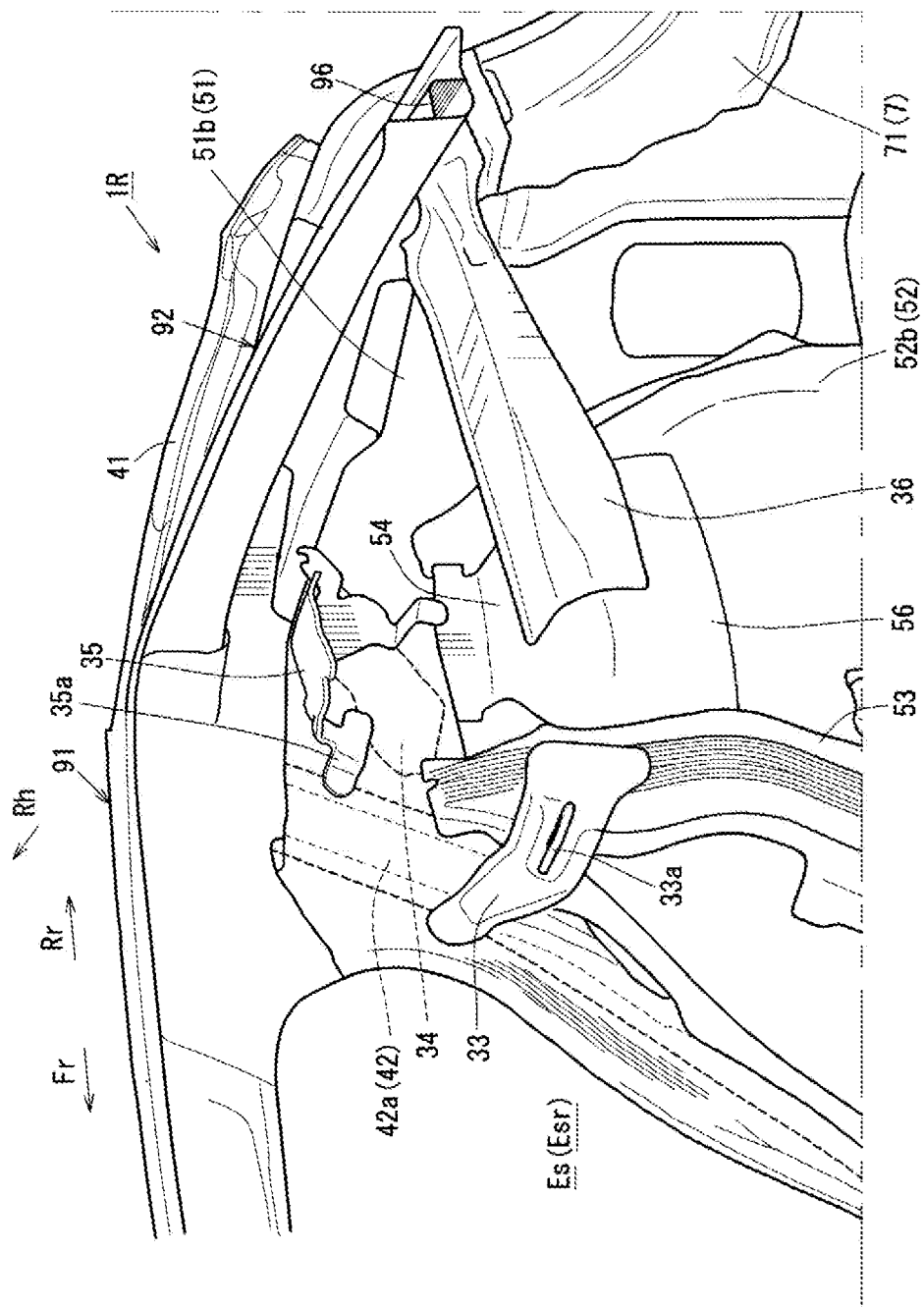
FIG. 6 An enlarged perspective view illustrating the main portion of the vehicle body structure in the vehicle rear portion of the embodiment when seen from the inside.

As illustrated in FIGS. 2, 3, and 5, the floor rear cross-member 23 rises to a level higher than the level of the upper surface of the tunnel portion 22, and a laterally intermediate portion of the floor rear cross-member 23 is joined to the tunnel portion 22. The floor rear cross-member 23 bridges rear ends of left and right side sills 46 described later.

As illustrated in FIGS. 2 and 5, the side sills 46 are joined and fixed to the outer lateral ends of the floor panel 21. As illustrated in FIG. 5, each of the side sills 46 is a vehicle body rigid member that has a closed cross-section space 46s extending in the vehicle longitudinal direction and formed by joining and fixing an inner panel 46a and an outer panel 46b each having a hat shape in cross section.

As illustrated in FIGS. 1, 2, and 5, a roof portion 9 of the vehicle is constituted by a pair of left and right roof side rails 91 extending in the vehicle longitudinal direction at the left and right sides of the vehicle body, a rear header 92 extending in the vehicle lateral direction at rear sides of the roof side rails 91, a roof cross-member 93 extending in the vehicle lateral direction in a longitudinally intermediate portion of the roof portion 9, a front header 94 extending in the vehicle lateral direction at front sides of the roof side rails 91, and a roof panel 95 covering a ceiling portion of the cabin 2.

Figure 9:
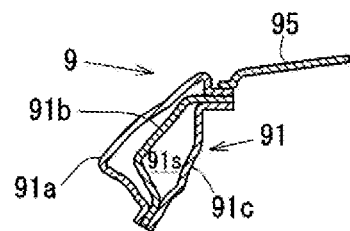
FIG. 9 An end view illustrating a side in a vehicle lateral direction taken along an A-A cross section in FIG. 3.
Figure 9:
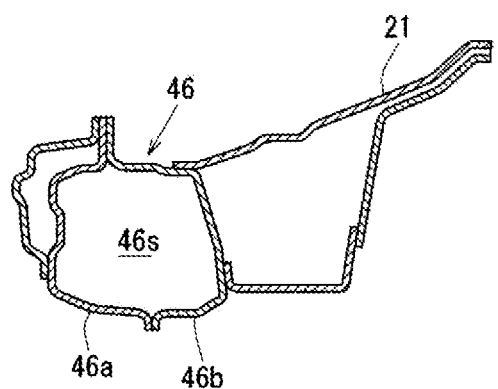

As illustrated in FIG. 9, each of the roof side rails 91 is a vehicle body rigid member that has a closed cross-section space 91s extending in the vehicle longitudinal direction and formed by welding and fixing a roof side rail outer panel 91a, a roof reinforcement 91b, and a roof side rail inner panel 91c.

As described above, the roof panel 95 is disposed over a region surrounded by the pair of left and right roof side rails 91, the front header 94, and the rear header 92, and extends in the vehicle longitudinal direction and the vehicle lateral direction in a vehicle upper portion. The roof panel 95 is a panel member made of a steel sheet. Each of the front header 94 and the rear header 92 constitutes a substantially closed cross-section space structure together with the roof panel 95 disposed above the front header 94 and the rear header 92. The front header 94 and the rear header 92 constitute vehicle body rigid members extending in the vehicle lateral direction in a front portion and a rear portion, respectively, of the roof panel 95.

Figure 4:
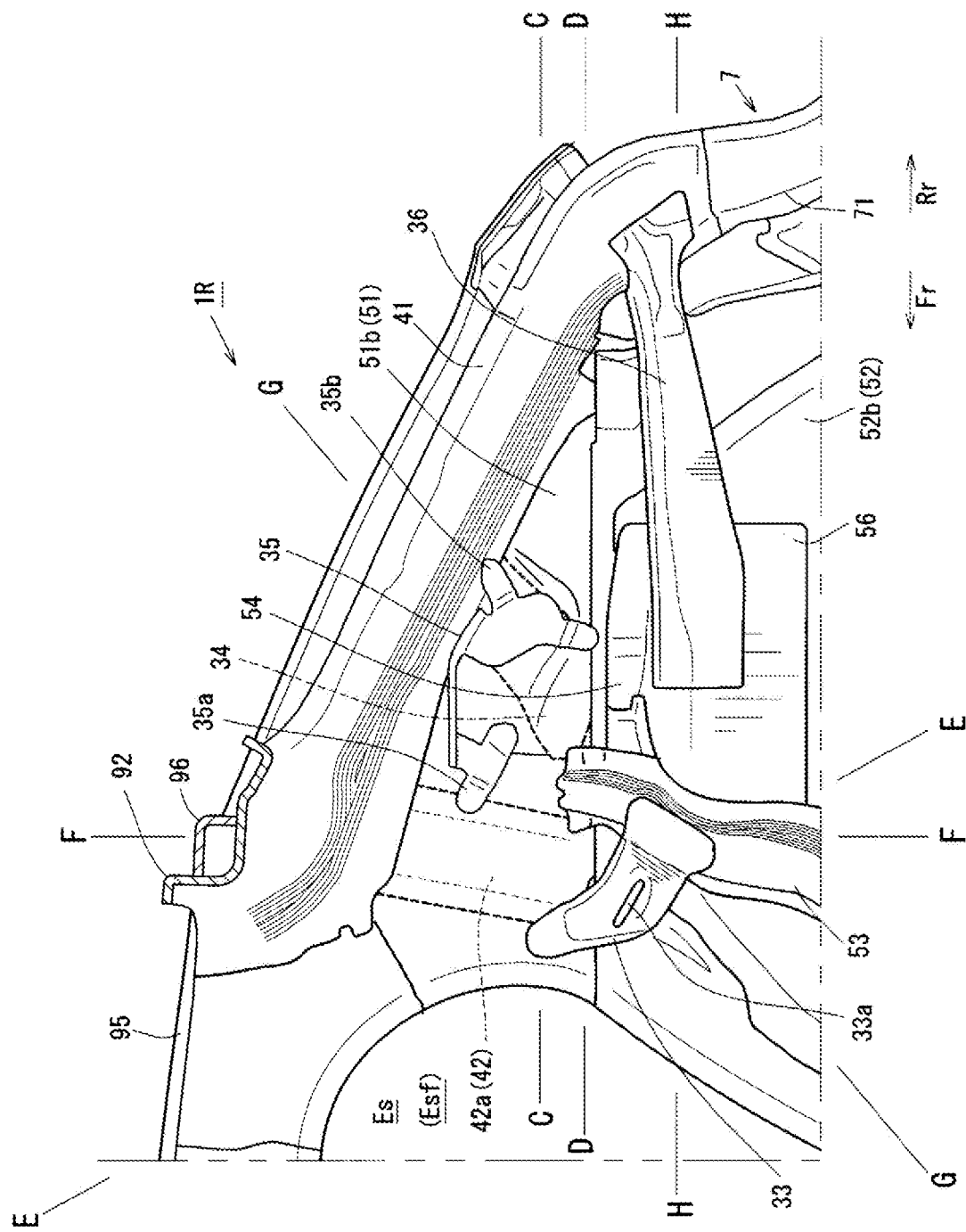
FIG. 4 An enlarged side view illustrating the main portion of the vehicle body structure in the vehicle rear portion of the embodiment when seen from the inside.

As illustrated in FIG. 4, the rear header 92 disposed at the rear of the roof panel 95 is integrated with a gutter portion 96 so that the rear header 92 and the gutter portion 96 form a closed cross-section space 92s extending in the vehicle lateral direction.

As illustrated in FIGS. 1 through 5, the rear opening Er is formed behind the rear header 92. Opening edges at the left and right sides of the rear opening Er are provided with a pair of left and right rear pillars 41 extending rearward and downward from the rear ends of the roof side rails 91 (i.e., portions corresponding to portions coupled to lateral ends of the rear header 92).

Figure 11:
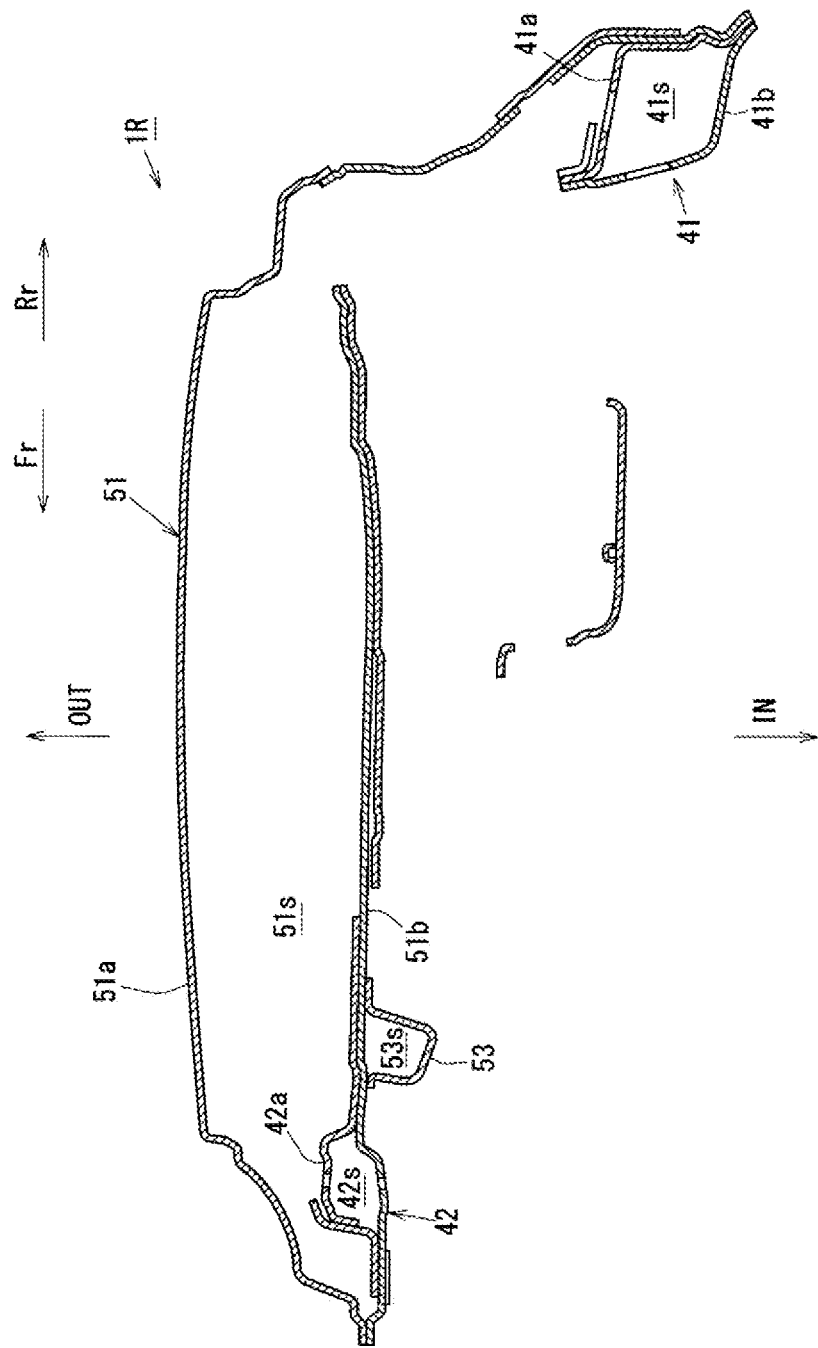
FIG. 11 An end view taken along a C-C cross section in FIG. 4.

As illustrated in FIG. 11, each of the rear pillars 41 is a vehicle body rigid member having a rear pillar closed cross-section space 41s formed by joining and fixing a rear pillar outer 41a and a rear pillar inner 41b.

As illustrated in FIGS. 3 and 10, the opening edge of the rear opening Er formed behind the rear header 92 is provided with a rear end cross-member 71 that extends in the vehicle lateral direction and couples lower ends of the pair of left and right rear pillars 41 extending rearward and downward from the rear ends of the roof side rails 91.

Specifically, at the rear of the trunk 3, the rear end cross-member 71 constitutes a rear end 7 extending upward from the rear end of the trunk floor portion 31, together with a rear end panel 72. The rear end panel 72 is a panel member extending upward from the rear end of the trunk floor portion 31. The rear end panel 72 constitutes a vehicle body rigid member having a closed cross-section space 71s extending in the vehicle lateral direction by joining the rear end cross-member 71 having a hat-shaped cross section to the inner surface of the upper end of the rear end panel 72 facing the trunk 3.

As illustrated in FIGS. 1 through 7, side pillars 42 extending downward and forward from the rear ends of the roof side rails 91 are disposed in both side portions of the vehicle body rear portion 1R between the rear ends of the side sills 46 and the rear ends of the roof side rails 91 (i.e., portions corresponding to portions joined to both lateral ends of the rear header 92). The side pillars 42 couple the rear ends of the side sills 46 to the rear ends of the roof side rails 91. The distance of the thus-configured side pillars 42 from damper support portions 54 increases toward the bottom.

As illustrated in FIGS. 1 through 3, in side portions of the vehicle body rear portion 1R, the center pillars 43 extending in the vehicle top-bottom direction (vertical direction) are disposed between longitudinally intermediate portions of the side sills 46 (i.e., portions of the side sills 46 ahead of a front cross-member 24) and longitudinally intermediate portions of the roof side rails 91 (i.e., portions of the roof side rails 91 corresponding to the roof cross-member 93 in the longitudinal direction). The center pillars 43 couple the intermediate portions of the side sills 46 to the intermediate portions of the roof side rails 91.

Although not shown, each of the center pillars 43 is a vehicle body rigid member having a closed cross-section space formed by joining and fixing a center pillar inner and a center pillar outer substantially entirely in the vehicle vertical direction. The center pillars 43 and 43 in the vehicle body side portions are respectively coupled to the left and right outer ends of the front cross-member 24 described later in the vehicle lateral direction.

In addition, as illustrated in FIG. 1, in side portions of the vehicle body front portion 1F, front pillars 44 and hinge pillars 45 extending in the vehicle vertical direction are disposed between the front ends of the side sills 46 and the front ends of the roof side rails 91 (i.e., portions corresponding to portions coupled to the lateral ends of the front header 94). The front pillars 44 and the hinge pillars 45 couple the front ends of the side sills 46 to the front ends of the roof side rails 91.

Figure 8:
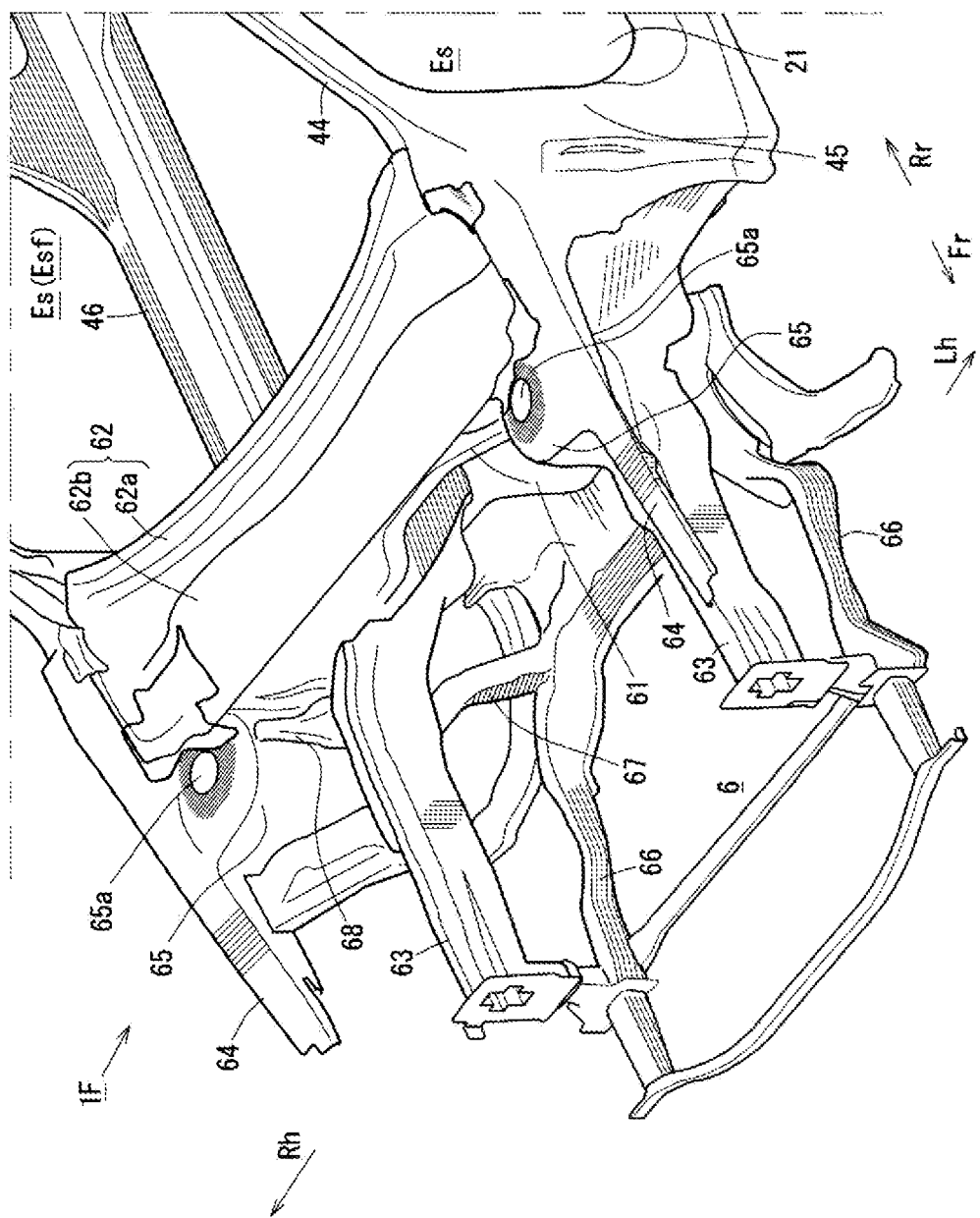
FIG. 8 A perspective view illustrating a vehicle body structure in a vehicle front portion according to the embodiment when seen from the front.

Specifically, as illustrated in FIGS. 1 and 8, in the vehicle body front portion 1F of this embodiment, the front pillars 44 extending from front lower portions to rear upper portions are disposed at the lateral sides, and lower portions of the front pillars 44 are coupled to the hinge pillars 45 extending in the vertical direction.

Each of the front pillars 44 joins a front pillar inner and a front pillar outer to each other. Each of the hinge pillars 45 joins a hinge pillar inner and a hinge pillar outer to each other. Each of the front pillars 44 and the hinge pillars 45 is a vehicle body rigid member having a closed cross-section space.

As described above, the pair of left and right roof side rails 91 extending in the vehicle longitudinal direction are continuously formed at the rear ends of the left and right front pillars 44. The front header 94 extending in the vehicle lateral direction (see FIG. 1) is bridged between the upper ends of the left and right front pillars 44 as described above. The rear header 92 extending in the vehicle lateral direction is bridged between the rear ends of the left and right roof side rails 91.

In the vehicle body front portion 1F of the vehicle body 1 constituting the side portions as described above, the center pillars 43, front half portions of the side sills 46, the hinge pillars 45, the front pillars 44, and front half portions of the roof side rails 91 constitute front side door openings Esf to which unillustrated front side doors are attached. In the vehicle body rear portion 1R, the center pillars 43, rear half portions of the side sills 46, the side pillars 42, and rear half portions of the roof side rails 91 constitute rear side door openings Esr to which unillustrated rear side doors are attached.

That is, the front side door openings Esf are formed ahead of the center pillars 43, the rear side door openings Esr are formed behind the center pillars 43. The side pillars 42 are disposed along the rear ends of the rear side door openings Esr.

As also described above, the front side door openings Esf at the vehicle front of (ahead of) the center pillars 43 and the rear side door openings Esr at the vehicle rear of (behind) the center pillars 43 are formed, and in the vehicle body side portions, the side sills 46, the hinge pillars 45, the front pillars 44, the roof side rails 91, and the side pillars 42 constitute the side door openings Es, and the side pillars 42 are disposed along the rear ends of the side door openings Es. In this manner, in the vehicle body side portions, the side sills 46, the hinge pillars 45, the front pillars 44, the roof side rails 91, and the side pillars 42 forming the side door openings Es constitute substantially ring-shaped vehicle body frameworks extending in the vehicle longitudinal direction (hereinafter referred to as longitudinal ring-shaped vehicle body frameworks SLC) as a vehicle body structure at each of the left and right vehicle body side portions, as illustrated in FIG. 1.

In the vehicle body rear portion 1R, as illustrated in FIGS. 3 through 7, 12, and 13, side panels 51 are disposed between the side pillars 42 and the rear pillars 41, that is, at laterally outer sides of the trunk 3. Below the side panels 51, rear wheelhouses 52 are disposed at laterally both sides of the trunk floor portion 31. Ahead of the rear wheelhouses 52, wheelhouse reinforcements 53 extending in the vertical direction are provided. In upper portions of the rear wheelhouses 52, the damper support portions 54 supporting upper portions of suspension dampers 55 are provided.

Figure 12:
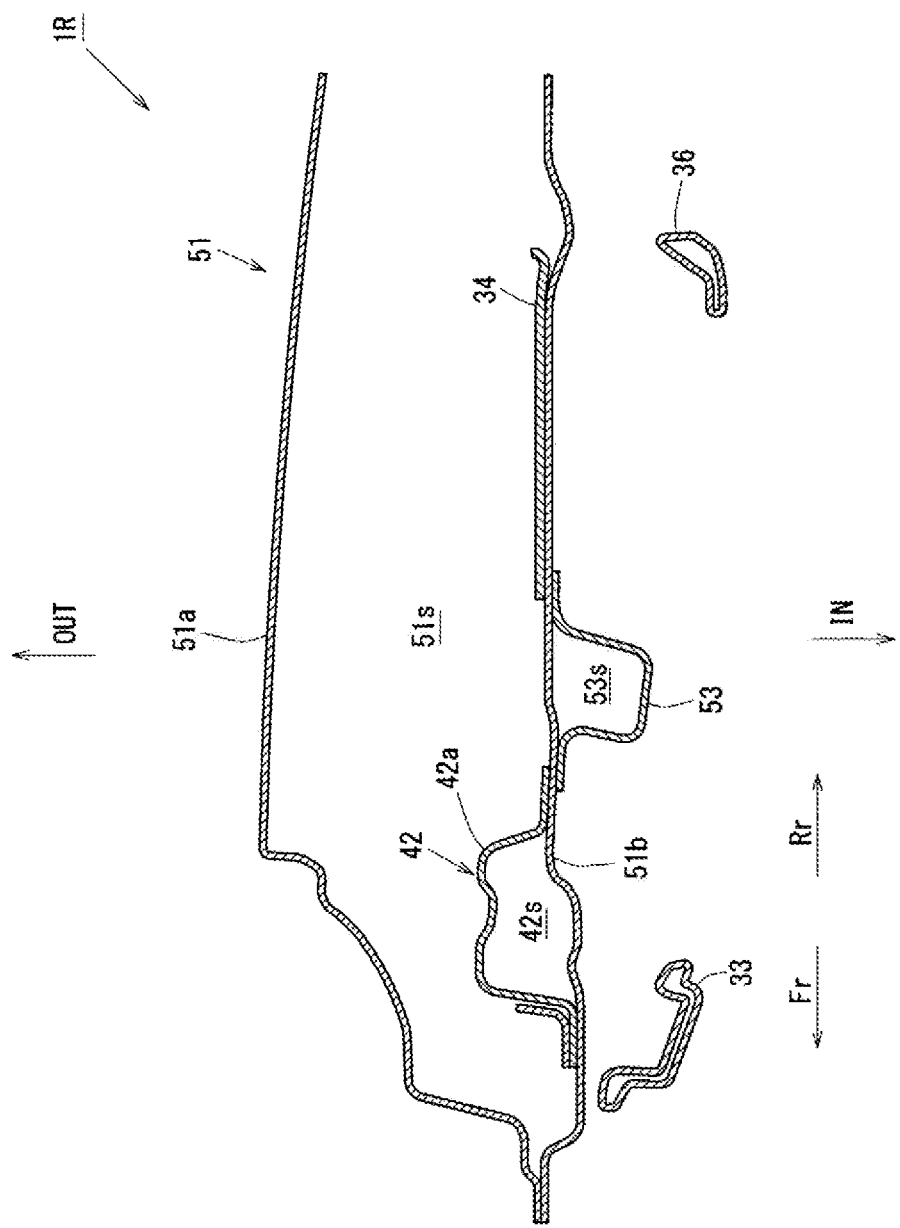
FIG. 12 An end view taken along a D-D cross section in FIG. 4.
Figure 14:
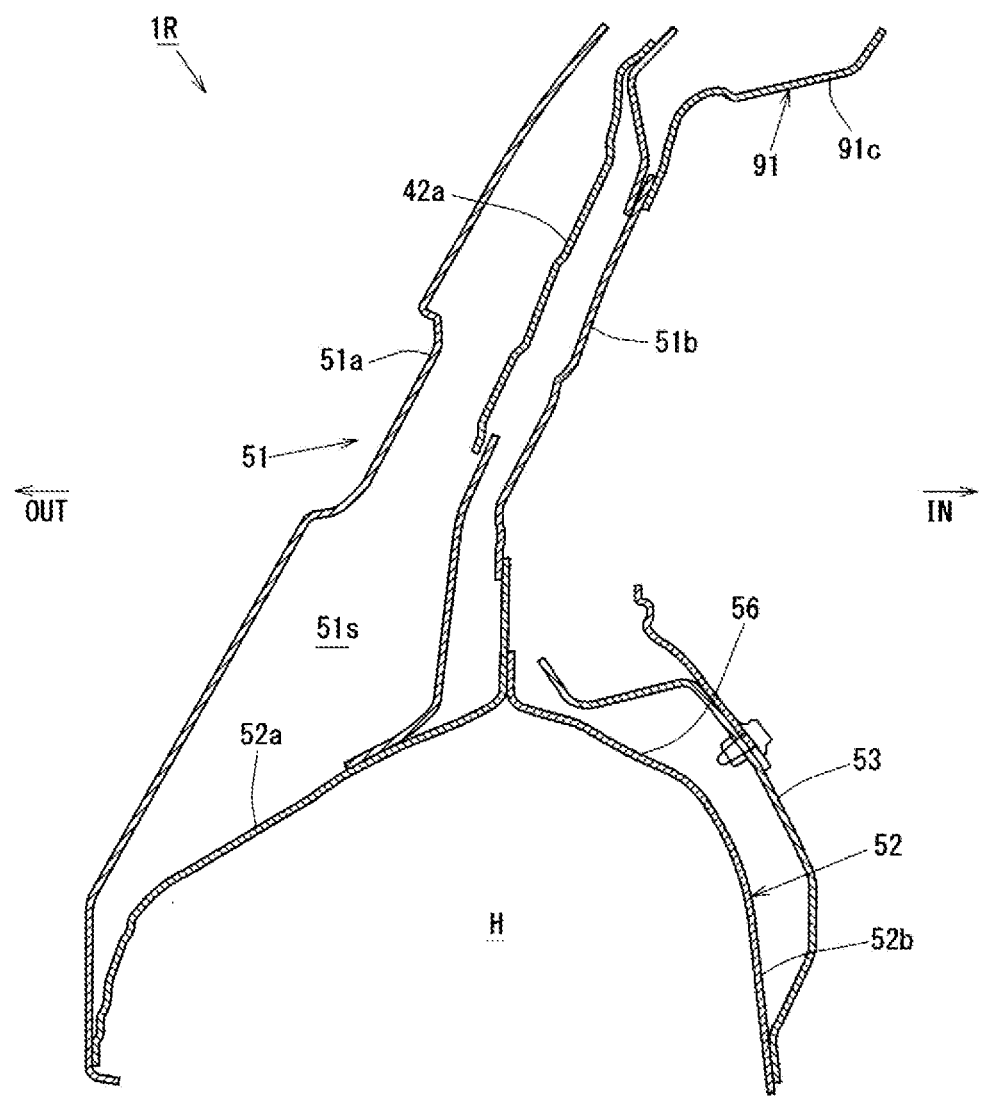
FIG. 14 An end view taken along an F-F cross section in FIG. 4.

As illustrated in FIGS. 12 and 14, each of the side panels 51 is constituted by a side panel outer 51a at a vehicle outer side and a side panel inner 51b toward the trunk 3. In a closed cross-section space 51s formed between the side panel outer 51a and the side panel inner 51b, the side pillar 42 is constituted by a side pillar reinforcement 42a attached to the side panel inner 51b.

Specifically, as illustrated in FIGS. 11 and 12, the side pillar reinforcement 42a having a substantially hat-shaped cross section in plan view is attached to the inner surface of the side panel inner 51b toward the closed cross-section space 51s so that the side panel inner 51b and the side pillar reinforcement 42a constitute the side pillar 42 serving as a vehicle body rigid member and having the closed cross-section space 42s extending in the vehicle vertical direction.

Figure 13:
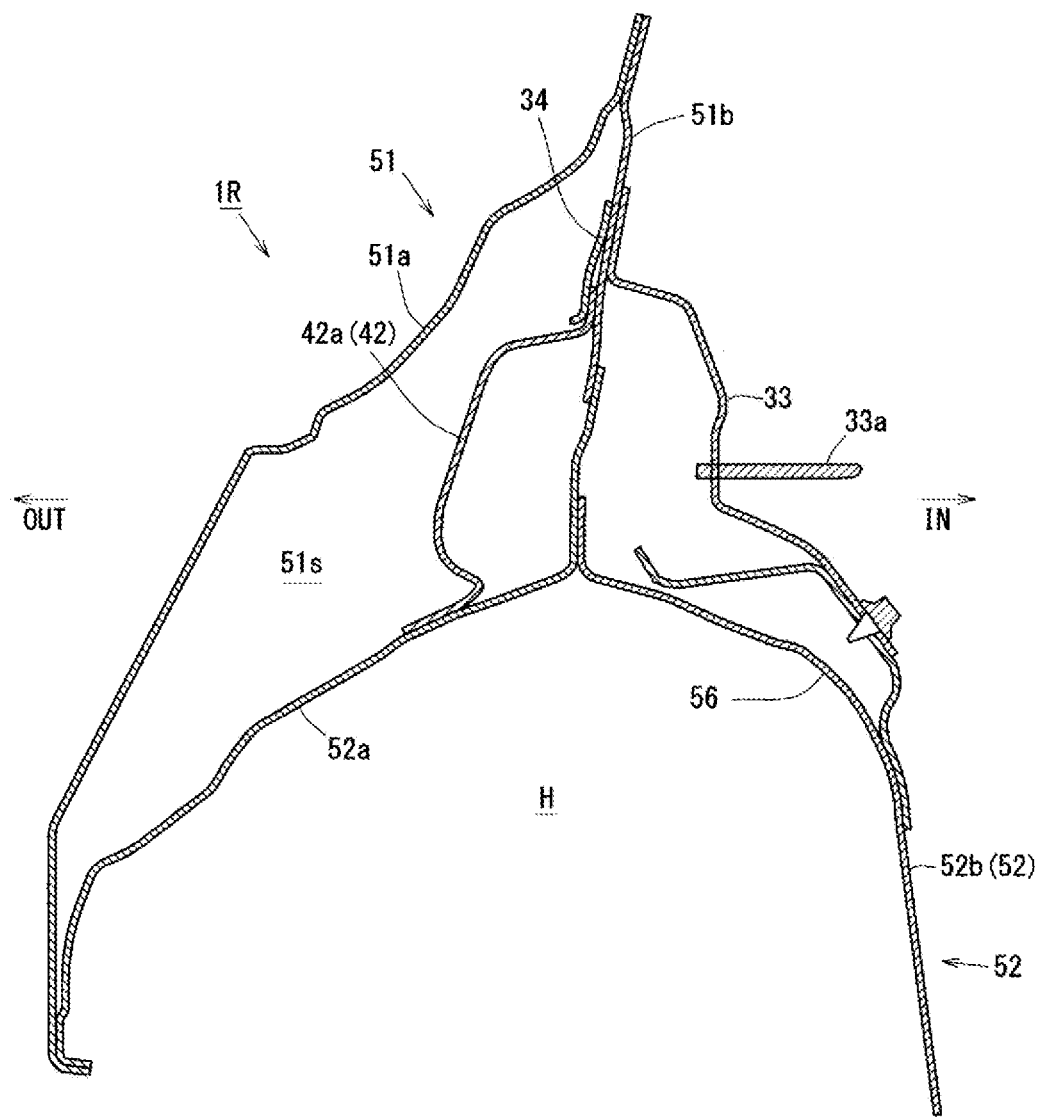
FIG. 13 An end view taken along an E-E cross section in FIG. 4.

As illustrated in FIG. 13, in a cross section in a vehicle front view, each of the rear wheelhouses 52 is constituted by a rear wheelhouse outer panel 52a and a rear wheelhouse inner panel 52b that are two branches, in the vehicle lateral direction, from the lower end of the side panel inner 51b constituting the side panel 51. The rear wheelhouse 52 forms a space where an unillustrated wheel is disposed at an outer side of the vehicle (hereinafter referred to as a "rear wheelhouse space H").

The rear wheelhouse outer panel 52a is formed to expand from the lower end of the side panel inner 51b outward in the vehicle lateral direction, and is coupled to the lower end of the side panel outer 51a at the outermost side and at the bottom. Thus, the rear wheelhouse outer panel 52a constitutes a bottom portion of the closed cross-section space 51s formed between the side panel outer 51a and the side panel inner 51b. The lower end of the side pillar reinforcement 42a constituting the side pillar 42 is coupled to an intermediate portion of the rear wheelhouse outer panel 52a.

The rear wheelhouse inner panel 52b is formed to expand from the lower end of the side panel inner 51b downward and inward in the vehicle lateral direction, that is, expand toward the trunk 3, and is coupled to the laterally outer end of the trunk floor portion 31 at the innermost side and at the bottom. Thus, the rear wheelhouse inner panel 52b has a substantially semicircular dome shape projecting from the side panel inner 51b toward the trunk 3.

As illustrated in FIG. 3, an upper portion of the thus-configured rear wheelhouse inner panel 52b, that is, a portion supporting the suspension damper 55 is thicker (hereinafter referred to as an upper thick portion 56) than the other portion, and constitutes a mechanical structural member.

As described above, the upper thick portion 56 thicker than the other portion constitutes the damper support portions 54 that fixes and supports the upper end of the suspension damper 55 (FIG. 2) disposed in the rear wheelhouse space H at the outer side of the vehicle.

Figure 7:
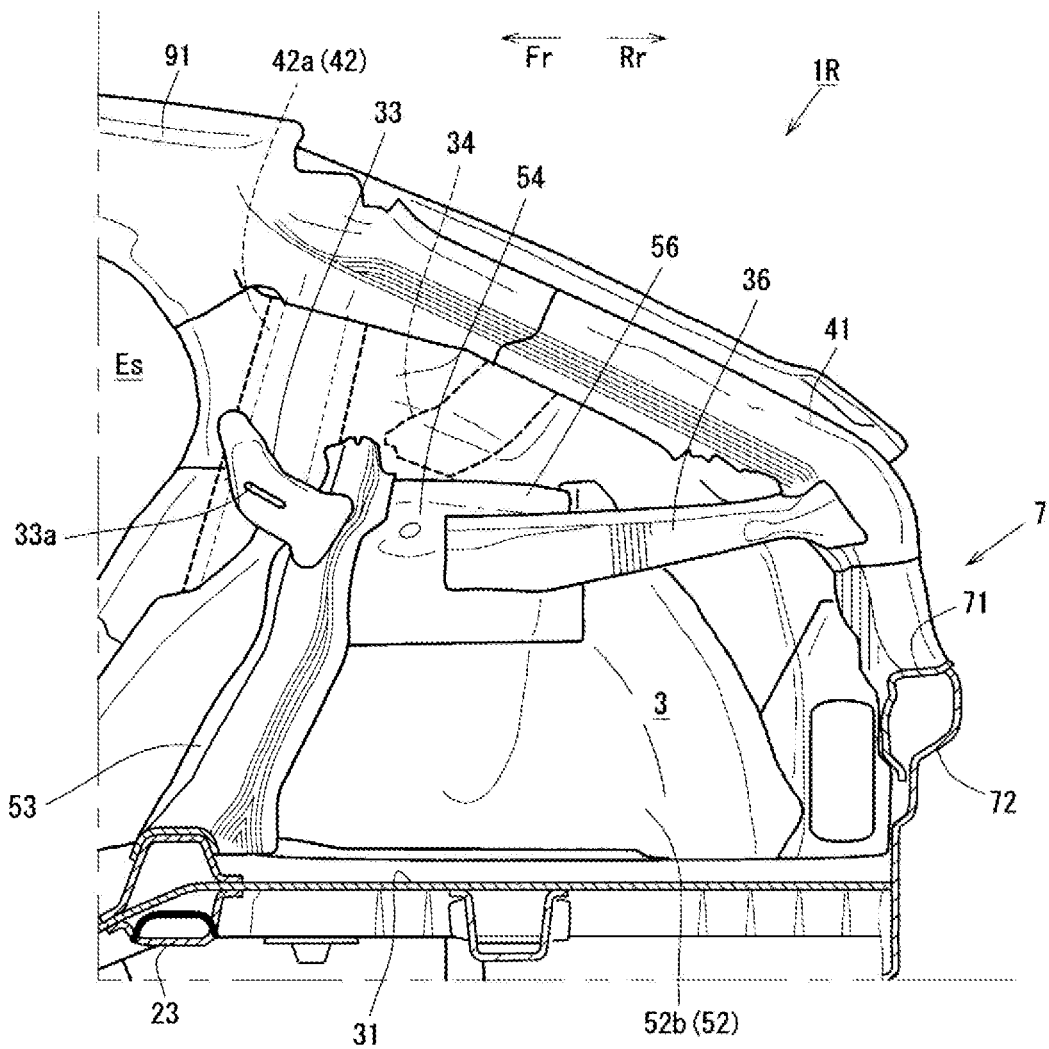
FIG. 7 An enlarged side view illustrating the main portion of the vehicle body structure in the vehicle rear portion of the embodiment when seen from the inside.

As illustrated in FIG. 7, ahead of the longitudinal center of the rear wheelhouse inner panel 52b, the wheelhouse reinforcement 53 is disposed along the surface of the rear wheelhouse inner panel 52b toward the trunk 3 while tilting forward from an upper portion of the rear wheelhouse inner panel 52b toward a lower portion of the rear wheelhouse inner panel 52b.

As illustrated in FIG. 12, the wheelhouse reinforcements 53 has a substantially hat-shaped cross section in plan view, and is attached to the inner surface of the rear wheelhouse inner panel 52b toward the trunk 3 so that the rear wheelhouse inner panel 52b and the wheelhouse reinforcements 53 constitute a vehicle body rigid member including a closed cross-section space 53s extending in the vehicle vertical direction.

An upper portion of the thus-configured wheelhouse reinforcements 53 is fixed to the upper thick portion 56 of the rear wheelhouse inner panel 52b, and a front portion of the upper end of the wheelhouse reinforcements 53 is coupled to the rear end of an upper portion of the side pillar 42 as illustrated in FIG. 12, which is a D-D end view in FIG. 4. As illustrated in FIG. 3, the lower end of the wheelhouse reinforcements 53 is coupled to the laterally outer side of the floor rear cross-member 23.

Coupling members 33 coupling the front ends of upper portions of the side pillars 42 to front parts of the damper support portions 54 near the upper ends of the wheelhouse reinforcements 53 are disposed in a substantially oblique direction toward the front and upward in the vehicle.

Figure 15:
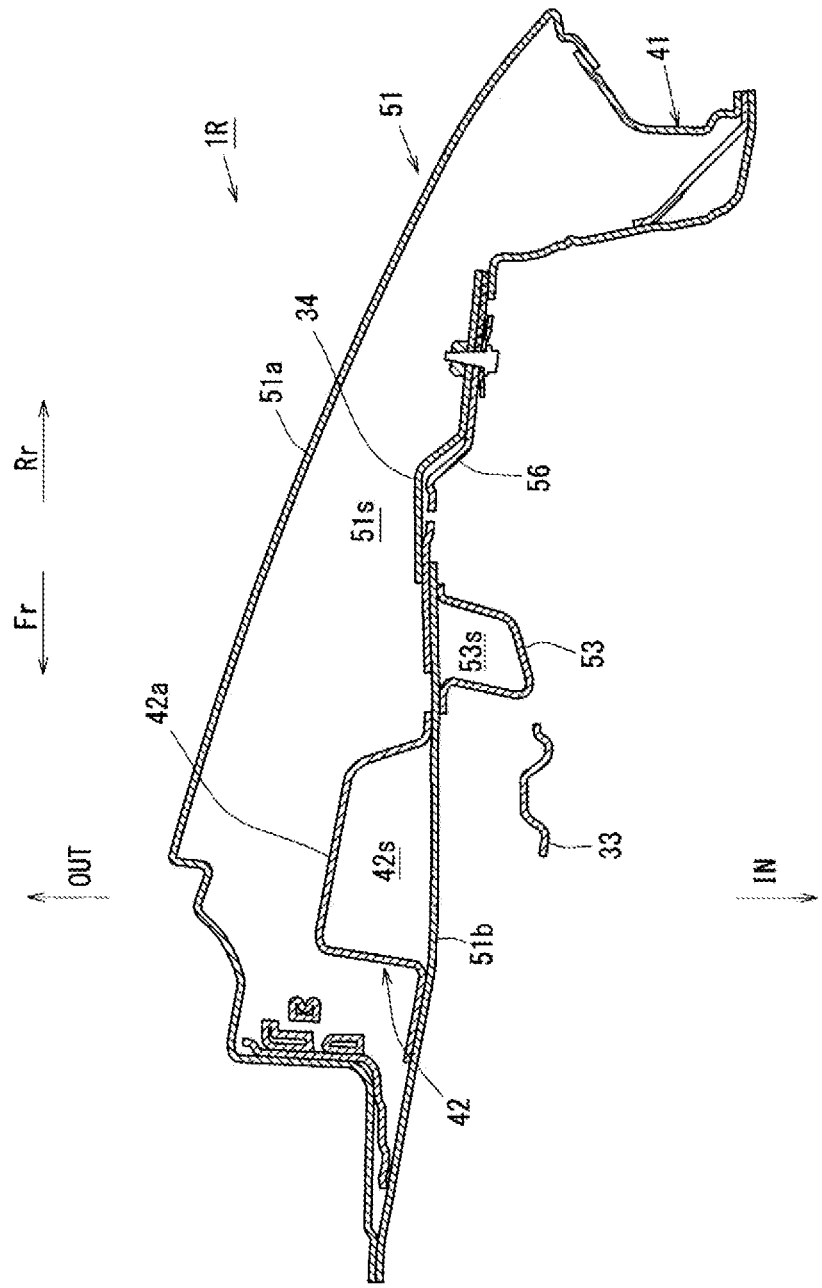
FIG. 15 An end view taken along a G-G cross section in FIG. 4.

Each of the coupling members 33 is a striker attachment bracket to which a striker 33a is attached. The striker 33a is configured to be engaged with a latch of a seat back constituting an unillustrated rear seat disposed on the floor panel 21 in a passenger space of the cabin 2. As illustrated in FIG. 15, which is a G-G end view in FIG. 4, each of the coupling members 33 has a projecting portion projecting toward the cabin 2 from the laterally outer side thereof, and is a structural member made of steel and having section stiffness.

As illustrated in FIG. 7, the rear end of each of the coupling members 33 is wide so as to be coupled to the projection of the wheelhouse reinforcement 53 having a hat shape in cross section. The width of the rear end of the coupling member 33 gradually decreases toward the front end of the coupling member 33 coupled to the front end of an upper portion of the side pillar 42. The coupling between the front end of the coupling member 33 to the upper end of the upper portion of the side pillar 42 and the coupling of the rear end of the coupling member 33 to the upper thick portion 56 as the front part of the damper support portion 54 near the upper end of the wheelhouse reinforcement 53 are made with unillustrated fastening bolts.

As illustrated in FIG. 13, the coupling of the front end of the coupling member 33 to the front end of the upper portion of the side pillar 42 is made by coupling the front end of the coupling member 33 to the front end of an upper portion of the side pillar reinforcement 42a disposed in the closed cross-section space 51s formed between the side panel outer 51a and the side panel inner 51b, through the side panel inner 51b. A portion of the coupling member 33 toward the wheelhouse reinforcement is coupled to a front part of the damper support portion.

In addition, as illustrated in FIG. 4, a reinforcing plate 34 coupling the rear pillar 41 to the rear end of an upper end portion of the wheelhouse reinforcement 53, and an attachment bracket 35 for attachment across the reinforcing plate 34 and the side pillar 42 are disposed at each side of the damper support portions 54 in the side panel 51.

The reinforcing plate 34 is an attachment plate for attaching a seatbelt retractor for a rear seat through the attachment bracket 35, and is a band-shaped plate member having a predetermined width and a predetermined thickness. The reinforcing plate 34 is disposed to extend upward and rearward in the vehicle.

As illustrated in FIG. 12, the reinforcing plate 34 is disposed along the side panel inner 51b in the closed cross-section space 51s formed by the side panel outer 51a and the side panel inner 51b.

As illustrated in FIG. 4, the attachment bracket 35 for attachment across the reinforcing plate 34 and the side pillar 42 includes: a front end attachment portion 35a that is a front end portion of the attachment bracket 35 and is attached to the side pillar 42; a rear end attachment portion 35b that is a rear end portion of the attachment bracket 35 and is attached to the reinforcing plate 34 through the side panel inner 51b; and an attachment body 35c that is located between the front end attachment portion 35a and the rear end attachment portion 35b and bends relative to the front end attachment portion 35a and the rear end attachment portion 35b. A seatbelt retractor for a rear seat is attached to the attachment body 35c in a predetermined orientation.

The rear end of the upper portion of the side pillar 42 is attached to the front end attachment portion 35a by coupling, with an unillustrated fastening bolt through the side panel inner 51b, the rear end of an upper portion of the side pillar reinforcement 42a disposed in the closed cross-section space 51s formed between the side panel outer 51a and the side panel inner 51b to the front end attachment portion 35a.

The rear end of the upper portion of the side pillar 42 is attached to the rear end attachment portion 35b by coupling, with an unillustrated fastening bolt through the side panel inner 51b, the rear end of the upper portion of the side pillar reinforcement 42a disposed in the closed cross-section space 51s formed between the side panel outer 51a and the side panel inner 51b to the rear end attachment portion 35b.

Figure 16:
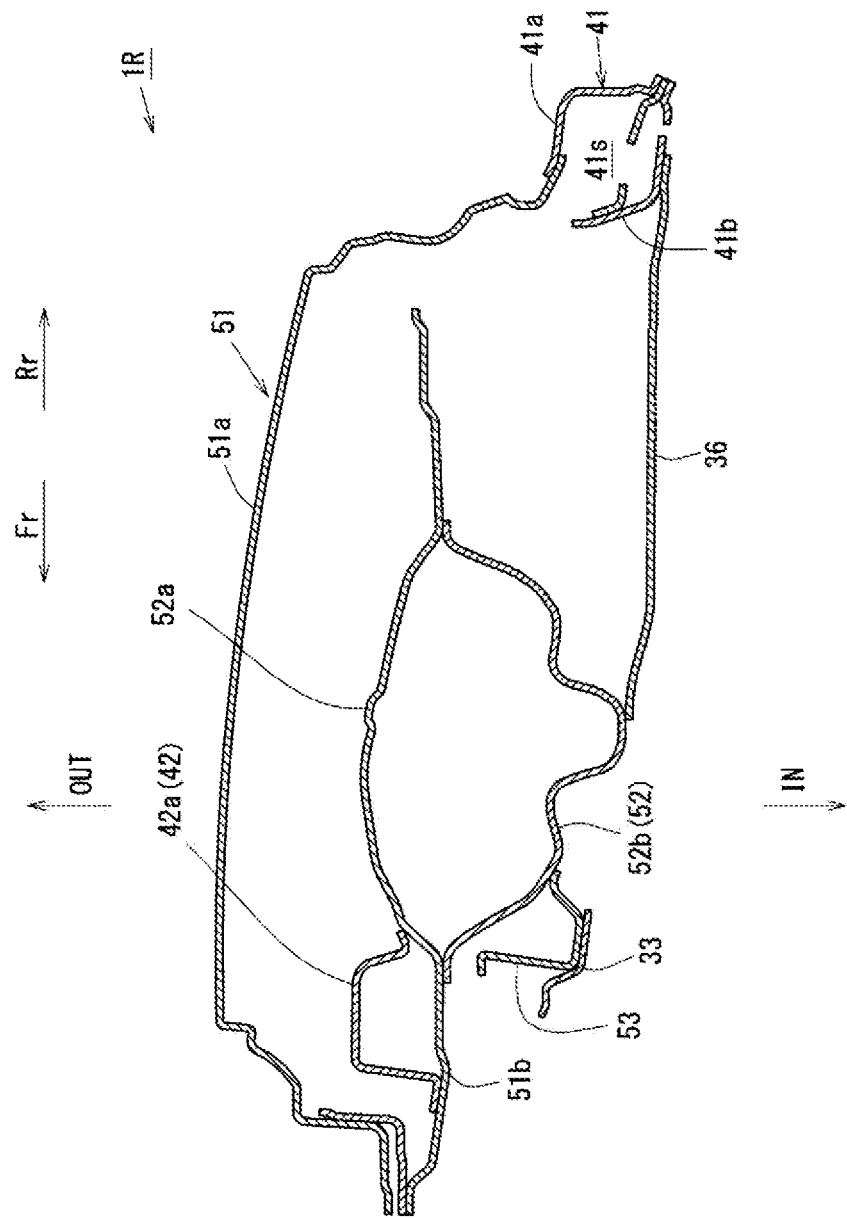
FIG. 16 An end view taken along an H-H cross section in FIG. 4.

As illustrated in FIGS. 4 and 16, coupling gussets 36 are provided to couple, in the vehicle longitudinal direction, the upper thick portions 56 constituting the damper support portions 54 in upper portions of the rear wheelhouses 52 to the lateral ends (i.e., portions of the rear end cross-member 71 coupled to the rear pillars 41) of the rear end cross-member 71 constituting the rear end 7.

As illustrated in FIG. 4, the front end of each coupling gusset 36 is fixed to the upper thick portion 56 in the upper portion of the rear wheelhouse inner panel 52b projecting toward the trunk 3 such that the front end of the coupling gusset 36 extends from the rear and laterally inside in the vehicle and covers the upper thick portion 56. The rear end of the coupling gusset 36 has a substantially inverted L cross section in a vehicle front view such that the rear end of the coupling gusset 36 can be fixed to a coupling portion between the rear pillar 41 and the rear end cross-member 71, and extends from the front and laterally inside in the vehicle and covers the coupling portion.

As described above, the rear end cross-member 71 is coupled to the rear lower ends of the rear pillars 41. The rear end cross-member 71 extending in the vehicle lateral direction, the pair of left and right coupling gussets 36, the upper thick portions 56 of the rear wheelhouses 52 including the pair of left and right damper support portions 54, the pair of left and right wheelhouse reinforcements 53, and the floor rear cross-member 23 extending in the vehicle lateral direction constitute a substantially ring-shaped vehicle body framework in the vehicle lateral direction having a substantially ring shape in a vehicle body front view and a vehicle body plan view (hereinafter referred to as a first rear lateral ring-shaped vehicle body framework RWC1), as a vehicle body structure (see FIG. 1).

The thus-configured coupling members 33, reinforcing plates 34, and attachment brackets 35 are used to constitute a substantially ring-shaped vehicle body framework in the vehicle lateral direction (hereinafter referred to as a second rear lateral ring-shaped vehicle body framework RWC2) (see FIG. 1).

Specifically, the rear header 92 in the vehicle lateral direction and the pair of left and right side pillars 42 constitute a vehicle body framework having a U shape that is open downward in a vehicle body front view. The floor rear cross-member 23 in the vehicle lateral direction and the wheelhouse reinforcements 53 at the left and right of the vehicle body constitute a vehicle body framework having a U shape that is open upward in a vehicle body front view.

The U shape that is open upward in the vehicle body front view and constituted by the wheelhouse reinforcements 53 disposed ahead of the rear wheelhouses 52 is disposed behind a vehicle body framework having a U shape that is open downward in a vehicle body front view and constituted by the side pillars 42 disposed along the rear ends of the side door openings Es.

On the other hand, the coupling members 33 couple the front ends of upper portions of the side pillars 42 constituting the vehicle body framework having the U shape that is open downward in the vehicle body front view to the upper thick portions 56 as front parts of the damper support portions 54 near the upper ends of the wheelhouse reinforcements 53 constituting the vehicle body framework having the U shape that is open upward in the vehicle body front view.

The reinforcing plates 34 couple the rear pillars 41 coupled to the rear header 92 constituting the vehicle body framework having the U shape that is open downward in the vehicle body front view to the rear ends of upper ends of the wheelhouse reinforcements 53 constituting the vehicle body framework having the U shape that is open upward in the vehicle body framework. The side pillars 42 and the reinforcing plates 34 constituting the vehicle body framework having the U shape that is open downward in the vehicle body front view are attached across the attachment brackets 35.

Thus, the vehicle body framework having the U shape that is open downward in the vehicle body front view and constituted by the side pillars 42 disposed along the rear ends of the side door openings Es and the vehicle body framework constituted by the wheelhouse reinforcements 53 disposed ahead of the rear wheelhouses 52 behind the vehicle body framework and having the U shape that is open upward in the vehicle body front view are coupled to each other through the coupling members 33 coupling the front ends of the upper portions of the side pillars 42 to the upper thick portions 56 as the front parts of the damper support portions 54 near the upper ends of the wheelhouse reinforcements 53 and the attachment brackets 35 for attachment across the reinforcing plates 34 coupled to the rear ends of the upper ends of the wheelhouse reinforcements 53 and the side pillars 42 constituting the vehicle body framework having the U shape that is open downward in the vehicle body front view.

In addition, the vehicle body framework having the U shape that is open downward in the vehicle front view and constituted by the side pillars 42 disposed along the rear ends of the side door openings Es and the vehicle body framework constituted by the wheelhouse reinforcements 53 disposed ahead of the rear wheelhouses 52 behind the vehicle body framework and having the U shape that is open upward in the vehicle body front view are coupled to each other through the reinforcing plates 34 coupling the rear pillars 41 coupled to the rear header 92 constituting the vehicle body framework having the U shape that is open downward in the vehicle body front view to the rear ends of the upper ends of the wheelhouse reinforcements 53 constituting the vehicle body framework having the U shape that is open upward in the vehicle front view.

In the manner described above, the vehicle body framework having the U shape that is open downward in the vehicle body front view and constituted by the side pillars 42 disposed along the rear ends of the side door openings Es and the vehicle body framework constituted by the wheelhouse reinforcements 53 disposed ahead of the rear wheelhouses 52 behind the vehicle body framework and having the U shape that is open upward in the vehicle body front view are coupled to each other through the coupling members 33 and the attachment brackets 35 and through the rear pillars 41 and the reinforcing plates 34. Thus, the rear header 92 in the vehicle lateral direction and the left and right side pillars 42, the coupling members 33 and the attachment brackets 35, the wheelhouse reinforcements 53, and the floor rear cross-member 23 in the vehicle lateral direction constitute the second rear lateral ring-shaped vehicle body framework RWC2 in the vehicle lateral direction.

In addition, the second rear lateral ring-shaped vehicle body framework RWC2 also includes, in addition to the substantially ring-shaped vehicle body framework, a substantially ring-shaped vehicle body framework passing through the reinforcing plates 34 coupled to the upper ends of the wheelhouse reinforcements 53 and the rear pillars 41 extending rearward from the rear ends of the roof side rails 91.

Since the thus-configured second rear lateral ring-shaped vehicle body framework RWC2 uses the side pillars 42 constituting the longitudinal ring-shaped vehicle body frameworks SLC along the side door openings Es, the second rear lateral ring-shaped vehicle body framework RWC2 and the longitudinal ring-shaped vehicle body frameworks SLC are coupled to each other mechanically, that is, a force exerted on at least one of the longitudinal ring-shaped vehicle body frameworks SLC or the second rear lateral ring-shaped vehicle body framework RWC2 can be transferred to the other.

As illustrated in FIG. 8, the vehicle body front portion 1F also includes a dash panel 61 rising from the front end of the floor panel 21, extending substantially across the entire width of the vehicle, and separating an engine room 6 and the cabin 2 from each other. Above the dash panel 61, a cowl panel 62a extending in the vehicle lateral direction and supporting the lower end of the front window across the substantially entire width of the vehicle is disposed. The cowl panel 62a constitutes a cowl cross 62 having a closed cross section, together with a cowl cross member 62b extending in the vehicle lateral direction. The lateral sides of the cowl cross 62 are coupled to coupling portions between the front pillars 44 and the hinge pillars 45 through side part panels.

A pair of left and right front side frames 63 is respectively disposed at the left and right sides of the engine room 6 in a front portion of the dash panel 61 and extends in vehicle longitudinal direction. A pair of left and right apron reinforcements 64 is disposed laterally outside the front side frames 63 and separated above the front side frames 63, and extends forward from the upper ends of the hinge pillars 45. Suspension towers 65 including front damper support portions 65a are disposed at the lateral sides of the engine room 6.

Below the pair of left and right front side frames 63, front subframes 66 extends in the lateral direction ahead of the dash panel 61. The rear ends of the front subframes 66 are coupled to each other below the rear ends of the front side frames 63, and are connected to ahead of the cross portions, ahead of the cross portion, are connected to through suspension cross support portions 67 that tilt upward and laterally outward ahead of the cross portion described above.

Suspension tower reinforcing members 68 constituted by closed cross sections extending in the vehicle vertical direction are disposed on the laterally inner side surfaces of the suspension towers 65 formed between the front side frames 63 and the apron reinforcements 64.

The thus-configured pair of left and right front subframes 66, suspension cross support portions 67, suspension tower reinforcing members 68, and cowl cross 62 in the vehicle lateral direction constitute a substantially ring-shaped vehicle body framework in the vehicle lateral direction (hereinafter referred to as a front lateral ring-shaped vehicle body framework FWC) near the front damper support portions 65a (see FIG. 1).

The lateral sides of the cowl cross 62 constituting the front lateral ring-shaped vehicle body framework FWC are coupled, through the side part panels, to the coupling portions between the front pillars 44 and the hinge pillars 45 constituting the longitudinal ring-shaped vehicle body frameworks SLC along the side door openings Es. Thus, the front lateral ring-shaped vehicle body framework FWC and the longitudinal ring-shaped vehicle body frameworks SLC are mechanically coupled to each other. That is, a force exerted on at least one of the longitudinal ring-shaped vehicle body frameworks SLC or the front lateral ring-shaped vehicle body framework FWC can be transferred to the other.

As described above, the vehicle body structure in a vehicle rear portion includes the first rear lateral ring-shaped vehicle body framework RWC1 disposed in the vehicle body rear portion 1R and extending from the vicinities of the pair of left and right damper support portions 54 supporting the suspension dampers 55 and disposed in the rear wheelhouses 52 behind the side door openings Es in the vehicle, across the rear end 7 extending in the vehicle lateral direction. The vehicle body structure also includes the longitudinal ring-shaped vehicle body frameworks SLC each having a ring shape in the vehicle longitudinal direction and constituted by the pair of left and right hinge pillars 45 disposed in the vehicle body front portion 1F, the pair of left and right front pillars 44 extending rearward from the upper ends of the hinge pillars 45, the pair of left and right roof side rails 91, the pair of left and right side pillars 42 disposed along the rear ends of the side door openings Es, and the pair of left and right side sills 46 coupling the lower ends of the side pillars 42 to the lower ends of the hinge pillars 45 in the vehicle longitudinal direction. The first rear lateral ring-shaped vehicle body framework RWC1 includes the rear end cross-member 71 coupling, in the vehicle lateral direction, the lower ends of the pair of left and right rear pillars 41 extending rearward and downward from the rear ends of the pair of left and right roof side rails 91, the pair of left and right coupling gussets 36 coupling the rear end cross-member 71 to the rear wheelhouses 52 in the vehicle longitudinal direction, the pair of left and right rear wheelhouses 52 having upper portions in which the damper support portions 54 are disposed, the pair of left and right wheelhouse reinforcements 53 disposed along the rear wheelhouses 52, located ahead of the damper support portions 54, and having front portions of the upper ends joined to the rear ends of the side pillars 42, and the floor rear cross-member 23 coupling the lower ends of the wheelhouse reinforcements 53 in the vehicle lateral direction. The vehicle body structure also includes the coupling members 33 to which the strikers 33a are attached and which couple the front ends of the side pillars 42 to the wheelhouse reinforcements 53. Accordingly, support stiffness of the suspensions can be enhanced in the entire vehicle body.

Specifically, the longitudinal ring-shaped vehicle body frameworks SLC each having a ring shape in the vehicle longitudinal direction and constituted by the pair of left and right hinge pillars 45 disposed in the vehicle body front portion 1F, the pair of left and right front pillars 44 extending rearward from the upper ends of the hinge pillars 45, the pair of left and right roof side rails 91, the pair of left and right side pillars 42 disposed along the rear ends of the side door openings Es, and the pair of left and right side sills 46 coupling the lower ends of the side pillars 42 to the lower ends of the hinge pillars 45 in the vehicle longitudinal direction. The first rear lateral ring-shaped vehicle body framework RWC1 is constituted by the rear end cross-member 71 coupling, in the vehicle lateral direction, the lower ends of the pair of left and right rear pillars 41 extending rearward and downward from the rear ends of the pair of left and right roof side rails 91, the pair of left and right coupling gussets 36 coupling the rear end cross-member 71 to the rear wheelhouses 52 in the vehicle longitudinal direction, the pair of left and right rear wheelhouses 52 having upper portions in which the damper support portions 54 are disposed, the pair of left and right wheelhouse reinforcements 53 disposed along the rear wheelhouses 52, located ahead of the damper support portions 54, and having front portions of the upper ends coupled to the rear ends of the side pillars 42, and the floor rear cross-member 23 coupling the lower ends of the wheelhouse reinforcements 53 in the vehicle lateral direction.

In addition, the front ends of the side pillars 42 constituting the longitudinal ring-shaped vehicle body frameworks SLC each having the substantially ring shape in the vehicle longitudinal direction are coupled to the wheelhouse reinforcements 53 constituting the first rear lateral ring-shaped vehicle body framework RWC1 having the substantially ring shape in the vehicle lateral direction by the coupling members 33 to which the strikers 33a are attached. Accordingly, the vehicle body frameworks having substantially ring shapes in multiple directions in the vehicle are formed so that support stiffness of the suspensions can be enhanced in the entire vehicle body. Thus, forces input by the front suspensions and the rear suspensions can be transferred without delay so that comfort of passengers can be enhanced.

Furthermore, the use of members for attaching the strikers 33a as the coupling members 33 constituting substantially ring-shaped vehicle body frameworks can suppress an increase in the number of parts and also suppress an increase in weight.

In addition, since the coupling members 33 can reinforce joint portions between the side pillars 42 and the wheelhouse reinforcements 53, the side pillars 42 and the wheelhouse reinforcements 53 can be coupled to each other with higher stiffness.

Moreover, even in the case where the lower ends of the side pillars 42 are separated from the damper support portions 54, the side pillars 42 and the wheelhouse reinforcements 53 can be coupled to each other while both of stiffness of the rear edges of the side door openings Es and support stiffness of the damper support portions 54 are ensured.

Since portions of the coupling members 33 toward the wheelhouse reinforcements 53 are coupled to front parts of the damper support portions 54, the pair of left and right rear wheelhouses 52 having upper portions in which the damper support portions 54 are disposed and constituting the first rear lateral ring-shaped vehicle body framework RWC1 having the substantially ring shape in the vehicle lateral direction are directly coupled to the coupling members 33. Accordingly, it is possible to enhance stiffness in coupling the longitudinal ring-shaped vehicle body frameworks SLC each having the substantially ring shape in the vehicle longitudinal direction to the first rear lateral ring-shaped vehicle body framework RWC1 having the substantially ring shape in the vehicle lateral direction.

Even in a case where the distance between the damper support portions 54 and the side pillar reinforcements 42a is large, stiffness of the damper support portions 54 is ensured by the coupling members 33 coupling the wheelhouse reinforcements 53 to the front ends of the side pillar reinforcements 42a, and the coupling members 33 for attaching portions of the wheelhouse reinforcements 53 and the strikers 33a are used for coupling the longitudinal ring-shaped vehicle body frameworks SLC having the substantially ring shape in the vehicle longitudinal direction to the first rear lateral ring-shaped vehicle body framework RWC1 having the substantially ring shape in the vehicle lateral direction.

The coupling members 33 are constituted by the striker attachment brackets to which the strikers 33a to be engaged with the latches of the seat backs are attached. Accordingly, the striker attachment brackets to be engaged with the latches of the seat backs function as the coupling members 33, and the striker attachment brackets are used for enhancing stiffness in coupling the longitudinal ring-shaped vehicle body frameworks SLC each having the substantially ring shape in the vehicle longitudinal direction to the first rear lateral ring-shaped vehicle body framework RWC1 having the substantially ring shape in the vehicle lateral direction.

The reinforcing plates 34 to which the seatbelt retractors are attached are disposed at the sides of the damper support portions 54 in the side panel inners 51b constituting the side pillars 42 together with the side pillar reinforcements 42a. The reinforcing plates 34 couple the rear pillars 41 extending rearward from the rear ends of the roof side rails 91 to the rear ends of the upper ends of the wheelhouse reinforcements 53. Thus, the reinforcing plates 34 disposed to the side panel inners 51b at the sides of the damper support portions 54 are coupled to the rear ends of the upper ends of the wheelhouse reinforcements 53, and the upper ends of the reinforcing plates 34 are coupled to the rear pillars 41. Accordingly, it is possible to enhance stiffness in coupling the longitudinal ring-shaped vehicle body frameworks SLC each having the substantially ring shape in the vehicle longitudinal direction to the first rear lateral ring-shaped vehicle body framework RWC1 having the substantially ring shape in the vehicle lateral direction by using the reinforcing plates 34 to which the seatbelt retractors are attached.

The reinforcing plates 34 are constituted by attachment plates to which the seatbelt retractors are attached. Accordingly, the attachment plates for the seatbelt retractors function as the reinforcing plate 34. The attachment plates are used for enhancing stiffness in coupling the longitudinal ring-shaped vehicle body frameworks SLC each having the substantially ring shape in the vehicle longitudinal direction to the first rear lateral ring-shaped vehicle body framework RWC1 having the substantially ring shape in the vehicle lateral direction.

The attachment brackets 35 are provided for attachment across the reinforcing plates and the side pillar reinforcements 42a. Accordingly, it is possible to enhance stiffness in coupling the longitudinal ring-shaped vehicle body frameworks SLC each having the substantially ring shape in the vehicle longitudinal direction to the first rear lateral ring-shaped vehicle body framework RWC1 having the substantially ring shape in the vehicle lateral direction by using the attachment brackets 35 to which the seatbelt retractors are attached.

Since the damper support portions 54 are constituted by the upper thick portions 56 extending to the wheelhouse reinforcements 53 and thicker than the other portion, the coupling gussets 36 constituting the first rear lateral ring-shaped vehicle body framework RWC1 having the substantially ring shape in the vehicle lateral direction couple the rear end cross-member 71 to the upper thick portions 56 in the rear wheelhouses 52 in the vehicle longitudinal direction. Thus, the vehicle body framework has higher stiffness.

Even in the case where the damper support portions 54 disposed in the rear wheelhouses 52 are separated away from the wheelhouse reinforcements 53, the upper thick portions 56 thicker than the other portion and extending to the wheelhouse reinforcements 53 can suppress a decrease in the support stiffness.

In addition, the roof side rails 91, the side pillar reinforcements 42a disposed at the rear ends of the side door openings Es, the wheelhouse reinforcements 53, and the floor rear cross-member 23 constitute the second rear lateral ring-shaped vehicle body framework RWC2 having the substantially ring shape in the vehicle lateral direction near the damper support portions 54 of the left and right rear suspensions. Thus, the first rear lateral ring-shaped vehicle body framework RWC1 having the substantially ring shape in the vehicle lateral direction and extending across the rear end 7 from portions near the damper support portions 54 in the left and right rear suspensions can be coupled to the second rear lateral ring-shaped vehicle body framework RWC2 having the substantially ring shape in the vehicle lateral direction around the vicinity of the damper support portions 54 of the left and right rear suspensions, by using the side pillar reinforcements 42a. Thus, support stiffness of the damper support portions 54 of the rear suspensions in the vehicle body rear portion 1R can be further enhanced so that support stiffness of the suspensions in the entire vehicle body can be enhanced.

As correspondences between the configuration of the technique disclosed here and the embodiment described above, a vehicle body framework having a substantially ring shape in a vehicle lateral direction corresponds to the first rear lateral ring-shaped vehicle body framework RWC1, and similarly, vehicle body frameworks each having a substantially ring shape in a vehicle longitudinal direction correspond to the longitudinal ring-shaped vehicle body frameworks SLC, a floor cross-member corresponds to the floor rear cross-member 23, a vehicle part corresponds to the striker 33a, a vehicle part corresponds to the seatbelt retractor, a thick portion corresponds to the upper thick portion 56, and a vehicle body framework having a substantially ring shape in the vehicle lateral direction near a damper support portion corresponds to the second rear lateral ring-shaped vehicle body framework RWC2. However, the technique disclosed here is not limited only to the configuration of the above embodiment, and is applicable to may embodiments.

For example, the foregoing description is directed to the vehicle body including the center pillars 43, but a two-door type vehicle body including no center pillars 43 may be used.

DESCRIPTION OF REFERENCE CHARACTERS 1R vehicle body rear portion
1F vehicle body front portion
7 rear end
23 floor rear cross-member
33 coupling member
35 attachment bracket
41 rear pillar
42 side pillar
42a side pillar reinforcement
44 front pillar
45 hinge pillar
46 side sill
51b side panel inner
52 rear wheelhouse
53 wheelhouse reinforcement
54 damper support portion
55 suspension damper
56 upper thick portion
71 rear end cross-member
91 roof side rail
Es side door opening
RWC1 first rear lateral ring-shaped vehicle body framework (second vehicle body framework)
RWC2 second rear lateral ring-shaped vehicle body framework (third vehicle body framework)
SLC longitudinal ring-shaped vehicle body framework (first vehicle body framework)

The invention claimed is:

1. A vehicle body structure comprising:
first vehicle body frameworks each having a substantially ring shape in a vehicle longitudinal direction and disposed at peripheries of side door openings of the vehicle; and
a second vehicle body framework having a substantially ring shape in a vehicle lateral direction and disposed at vehicle rear of the side door openings of the vehicle, wherein
the first vehicle body framework includes
a pair of left and right hinge pillars disposed in a vehicle front portion,
a pair of left and right front pillars extending rearward in the vehicle from upper ends of the pair of left and right hinge pillars,
a pair of left and right roof side rails extending rearward in the vehicle from upper ends of the pair of left and right front pillars,
a pair of left and right side pillars disposed along rear ends of the side door openings, and
a pair of left and right side sills coupling lower ends of the pair of left and right side pillars to lower ends of the pair of left and right hinge pillars in the vehicle longitudinal direction,
the second vehicle body framework includes
a rear end cross-member coupling, in the vehicle lateral direction, lower ends of a pair of left and right rear pillars extending rearward and downward in the vehicle from lower ends of the pair of left and right roof side rails,
a pair of left and right rear wheelhouses, damper support portions supporting suspension dampers being disposed in upper portions of the pair of left and right rear wheelhouses, a pair of left and right coupling gussets coupling the rear end cross-member to the upper portions of the pair of left and right rear wheelhouses in the vehicle longitudinal direction, a pair of left and right wheelhouse reinforcements disposed along the pair of left and right rear wheelhouses and located at vehicle front of the damper support portions, front portions of upper ends of the pair of left and right wheelhouse reinforcements being joined to rear ends of the pair of left and right side pillars, and a floor cross-member coupling lower ends of the pair of left and right wheelhouse reinforcements in the vehicle lateral direction, and the vehicle body structure further comprises coupling members coupling front ends of the pair of left and right side pillars to the pair of left and right wheelhouse reinforcements, vehicle parts being attached to the coupling members.

2. The vehicle body structure according to claim 1, wherein
portions of the coupling members toward the pair of left and right wheelhouse reinforcements are coupled to front parts of the damper support portions.

3. The vehicle body structure according to claim 1, wherein
the coupling members are constituted by striker attachment brackets to which strikers are attached, and the striker attachment brackets are configured to be engaged with latches of seat backs.

4. The vehicle body structure according to claim 1, wherein
reinforcing plates to which vehicle parts are attached are disposed at sides of the damper support portions in side panel inners constituting the pair of left and right side pillars together with side pillar reinforcements, and
the reinforcing plates couple rear pillars extending rearward from rear ends of the pair of left and right roof side rails to rear ends of upper ends of the pair of left and right wheelhouse reinforcements.

5. The vehicle body structure according to claim 4, wherein
the reinforcing plates are constituted by attachment plates to which seatbelt retractors are attached.

6. The vehicle body structure according to claim 5, wherein
attachment brackets are disposed for attachment across the attachment plates and the side pillar reinforcements.

7. The vehicle body structure according to claim 1, wherein
the damper support portions extend to the pair of left and right wheelhouse reinforcements, and are constituted by thick portions thicker than other portions.

8. The vehicle body structure according to claim 1, further comprising:
a third vehicle body framework having a substantially ring shape in the vehicle lateral direction and disposed near the damper support portions of left and right rear suspensions, wherein
the third vehicle body framework includes
a rear header,
side pillar reinforcements disposed at rear ends of the side door openings,
the pair of left and right wheelhouse reinforcements, and
a floor cross-member.

9. The vehicle body structure according to claim 2, wherein
the coupling members are constituted by striker attachment brackets to which strikers are attached, and the striker attachment brackets are configured to be engaged with latches of seat backs.

10. The vehicle body structure according to claim 2, wherein
reinforcing plates to which vehicle parts are attached are disposed at sides of the damper support portions in side panel inners constituting the pair of left and right side pillars together with side pillar reinforcements, and
the reinforcing plates couple rear pillars extending rearward from rear ends of the pair of left and right roof side rails to rear ends of upper ends of the pair of left and right wheelhouse reinforcements.

11. The vehicle body structure according to claim 3, wherein
reinforcing plates to which vehicle parts are attached are disposed at sides of the damper support portions in side panel inners constituting the pair of left and right side pillars together with side pillar reinforcements, and
the reinforcing plates couple rear pillars extending rearward from rear ends of the pair of left and right roof side rails to rear ends of upper ends of the pair of left and right wheelhouse reinforcements.

12. The vehicle body structure according to claim 9, wherein
reinforcing plates to which vehicle parts are attached are disposed at sides of the damper support portions in side panel inners constituting the pair of left and right side pillars together with side pillar reinforcements, and
the reinforcing plates couple rear pillars extending rearward from rear ends of the pair of left and right roof side rails to rear ends of upper ends of the pair of left and right wheelhouse reinforcements.

13. The vehicle body structure according to claim 10, wherein
the reinforcing plates are constituted by attachment plates to which seatbelt retractors are attached.

14. The vehicle body structure according to claim 11, wherein
the reinforcing plates are constituted by attachment plates to which seatbelt retractors are attached.

15. The vehicle body structure according to claim 12, wherein
the reinforcing plates are constituted by attachment plates to which seatbelt retractors are attached.

16. The vehicle body structure according to claim 13, wherein
attachment brackets are disposed for attachment across the attachment plates and the side pillar reinforcements.

17. The vehicle body structure according to claim 14, wherein
attachment brackets are disposed for attachment across the attachment plates and the side pillar reinforcements.

18. The vehicle body structure according to claim 15, wherein
attachment brackets are disposed for attachment across the attachment plates and the side pillar reinforcements.

* * * * *